(12) United States Patent
Binder

(10) Patent No.: US 7,860,084 B2
(45) Date of Patent: *Dec. 28, 2010

(54) OUTLET WITH ANALOG SIGNAL ADAPTER, A METHOD FOR USE THEREOF AND A NETWORK USING SAID OUTLET

(75) Inventor: Yehuda Binder, Hod Hassharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 73 days.

This patent is subject to a terminal disclaimer.

(21) Appl. No.: 12/018,310

(22) Filed: Jan. 23, 2008

(65) Prior Publication Data

US 2008/0120663 A1    May 22, 2008

Related U.S. Application Data

(63) Continuation of application No. 11/312,472, filed as application No. PCT/IL01/00943 on Oct. 11, 2001, now Pat. No. 7,453,895.

(51) Int. Cl.
*H04L 12/66* (2006.01)

(52) U.S. Cl. .................. 370/353; 370/352; 370/356

(58) Field of Classification Search .................. None
See application file for complete search history.

(56) References Cited

U.S. PATENT DOCUMENTS

| | | | |
|---|---|---|---|
| 2,264,395 A | 12/1941 | Mitchell | |
| 2,264,396 A | 12/1941 | Moore | |
| 2,510,273 A | 6/1950 | Barstow et al. | |
| 2,516,211 A | 7/1950 | Hochgraf | |
| 2,568,342 A | 9/1951 | Koehler et al. | |
| 3,280,259 A | 10/1966 | Cotter | |
| 3,366,744 A | 1/1968 | Miller | |

(Continued)

FOREIGN PATENT DOCUMENTS

CN    1283932    2/2001

(Continued)

OTHER PUBLICATIONS

H. Fukagawa, et al., Bus Wiring System for Residences, Matsushita Electric Works Technical Report, No. 36, Feb. 1988, pp. 31-35.

(Continued)

*Primary Examiner*—Raj K Jain
(74) *Attorney, Agent, or Firm*—Browdy and Neimark, PLLC

(57) ABSTRACT

A device for a LAN, containing an integrated adapter that converts digital data to and from analog video signals, allowing the use of analog video units in a digital data network or telephone line-based data networking system, eliminating the need for digital video units or external adapter. The device may include a hub for connecting an analog video signal via an adapter, and retaining the data network connection. In such an environment, the data networking circuitry as well as the analog video adapters are integrated into a telephone device, providing for regular telephone service, analog video connectivity, and data networking as well. In such a configuration, the device would have a standard telephone jack, an analog video jack and at least one data networking jack. Such device can be used to retrofit existing LAN and telephone wiring, and original equipment in new installations.

100 Claims, 12 Drawing Sheets

U.S. PATENT DOCUMENTS

| | | |
|---|---|---|
| 3,369,078 A | 2/1968 | Stradley |
| 3,406,344 A | 10/1968 | Hopper |
| 3,511,936 A | 5/1970 | Saltzberg |
| 3,529,088 A | 9/1970 | Hauer |
| 3,651,471 A | 3/1972 | Hasselwood et al. |
| 3,723,653 A | 3/1973 | Tatsuzawa |
| 3,730,980 A | 5/1973 | Kirk, Jr. |
| 3,739,226 A | 6/1973 | Seiter |
| 3,805,265 A | 4/1974 | Lester |
| 3,836,888 A | 9/1974 | Boenke et al. |
| 3,846,703 A | 11/1974 | Stewart et al. |
| 3,872,253 A | 3/1975 | Jurschak |
| 3,872,319 A | 3/1975 | Platzer |
| 3,873,771 A | 3/1975 | Kleinerman et al. |
| 3,875,339 A | 4/1975 | Gruen et al. |
| 3,876,984 A | 4/1975 | Chertok |
| 3,886,454 A | 5/1975 | Oakley et al. |
| 3,937,889 A | 2/1976 | Bell, III et al. |
| 3,949,172 A | 4/1976 | Brown et al. |
| 3,992,589 A | 11/1976 | Kuegler |
| 4,008,369 A | 2/1977 | Theurer et al. |
| 4,031,543 A | 6/1977 | Holz |
| 4,035,838 A | 7/1977 | Bassani et al. |
| 4,054,910 A | 10/1977 | Chou et al. |
| 4,058,678 A | 11/1977 | Dunn et al. |
| 4,063,220 A | 12/1977 | Metcalfe et al. |
| 4,079,415 A | 3/1978 | Will |
| 4,171,467 A | 10/1979 | Evenchik |
| 4,206,320 A | 6/1980 | Keasler et al. |
| 4,262,171 A | 4/1981 | Schneider et al. |
| 4,302,629 A | 11/1981 | Foulkes et al. |
| 4,303,993 A | 12/1981 | Panepinto, Jr. et al. |
| 4,328,579 A | 5/1982 | Hashimoto et al. |
| 4,332,980 A | 6/1982 | Reynolds et al. |
| 4,339,816 A | 7/1982 | Reed |
| 4,343,042 A | 8/1982 | Schrock et al. |
| 4,367,548 A | 1/1983 | Cotten, Jr. et al. |
| 4,378,470 A | 3/1983 | Murto et al. |
| 4,380,009 A | 4/1983 | Long et al. |
| 4,381,427 A | 4/1983 | Cheal et al. |
| 4,387,271 A | 6/1983 | Artom |
| 4,388,489 A | 6/1983 | Wigan et al. |
| 4,393,508 A | 7/1983 | Boudault |
| 4,413,229 A | 11/1983 | Grant |
| 4,425,642 A | 1/1984 | Moses et al. |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,444,999 A | 4/1984 | Sparrevohn |
| 4,449,218 A | 5/1984 | Strehl |
| 4,456,985 A | 6/1984 | Carsten et al. |
| 4,456,986 A | 6/1984 | Carsten et al. |
| 4,459,434 A | 7/1984 | Benning et al. |
| 4,462,113 A | 7/1984 | Iwata |
| 4,475,193 A | 10/1984 | Brown |
| 4,479,033 A | 10/1984 | Brown et al. |
| 4,484,185 A | 11/1984 | Graves |
| 4,484,218 A | 11/1984 | Boland et al. |
| 4,485,400 A | 11/1984 | Lemelson et al. |
| 4,493,948 A | 1/1985 | Sues et al. |
| 4,500,751 A | 2/1985 | Darland et al. |
| 4,506,387 A | 3/1985 | Walter |
| 4,509,211 A | 4/1985 | Robbins |
| 4,512,025 A | 4/1985 | Frankel et al. |
| 4,512,033 A | 4/1985 | Schrock |
| 4,514,594 A | 4/1985 | Brown et al. |
| 4,521,881 A | 6/1985 | Stapleford et al. |
| 4,523,307 A | 6/1985 | Brown et al. |
| 4,528,422 A | 7/1985 | Cupani |
| 4,538,174 A | 8/1985 | Gargini et al. |
| 4,546,212 A | 10/1985 | Crowder, Sr. |
| 4,551,721 A | 11/1985 | Kozlik |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,535 A | 3/1986 | Simmons |
| 4,578,540 A | 3/1986 | Borg et al. |
| 4,580,291 A | 4/1986 | Ab Der Halden |
| 4,584,690 A | 4/1986 | Cafiero et al. |
| 4,597,077 A | 6/1986 | Nelson et al. |
| 4,604,741 A | 8/1986 | Barsellotti |
| 4,608,686 A | 8/1986 | Barsellotti |
| 4,623,920 A | 11/1986 | Dufresne et al. |
| 4,631,367 A | 12/1986 | Coviello et al. |
| 4,636,914 A | 1/1987 | Belli |
| 4,644,526 A | 2/1987 | Wu |
| 4,646,289 A | 2/1987 | Tsiakas et al. |
| 4,646,296 A | 2/1987 | Bartholet et al. |
| 4,647,725 A | 3/1987 | Dellinger et al. |
| 4,649,551 A | 3/1987 | Sander et al. |
| 4,651,022 A | 3/1987 | Cowley |
| 4,656,655 A | 4/1987 | Hashimoto |
| 4,665,516 A | 5/1987 | Middleton et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,679,227 A | 7/1987 | Hughes-Hartogs |
| 4,701,945 A | 10/1987 | Pedigo |
| 4,703,499 A | 10/1987 | Fossas et al. |
| 4,709,412 A | 11/1987 | Seymour et al. |
| 4,731,821 A | 3/1988 | Jackson, III |
| 4,734,932 A | 3/1988 | Lott |
| 4,740,963 A | 4/1988 | Eckley |
| 4,748,656 A | 5/1988 | Gibbs et al. |
| 4,750,094 A | 6/1988 | Krasik |
| 4,754,326 A | 6/1988 | Kram et al. |
| 4,755,792 A | 7/1988 | Pezzolo et al. |
| 4,757,495 A | 7/1988 | Decker et al. |
| 4,757,497 A | 7/1988 | Beierle et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,776,006 A | 10/1988 | Comerford et al. |
| 4,780,757 A | 10/1988 | Bryer et al. |
| 4,780,758 A | 10/1988 | Lin et al. |
| 4,785,448 A * | 11/1988 | Reichert et al. .............. 370/488 |
| 4,785,472 A | 11/1988 | Shapiro |
| 4,787,082 A | 11/1988 | Delaney et al. |
| 4,789,895 A | 12/1988 | Mustafa et al. |
| 4,789,994 A | 12/1988 | Randall et al. |
| 4,799,213 A | 1/1989 | Fitzgerald |
| 4,807,225 A | 2/1989 | Fitch |
| 4,814,941 A | 3/1989 | Speet et al. |
| 4,821,319 A | 4/1989 | Middleton et al. |
| 4,825,435 A | 4/1989 | Amundsen et al. |
| 4,829,570 A | 5/1989 | Schotz |
| 4,837,799 A | 6/1989 | Prohs et al. |
| 4,839,743 A | 6/1989 | Best et al. |
| 4,843,606 A | 6/1989 | Bux et al. |
| 4,847,903 A | 7/1989 | Schotz |
| 4,849,811 A | 7/1989 | Kleinerman |
| 4,866,704 A | 9/1989 | Bergman |
| 4,882,747 A | 11/1989 | Williams |
| 4,885,747 A | 12/1989 | Foglia |
| 4,885,766 A | 12/1989 | Yasuoka et al. |
| 4,885,803 A | 12/1989 | Hermann et al. |
| 4,888,795 A | 12/1989 | Ando et al. |
| 4,890,316 A | 12/1989 | Walsh et al. |
| 4,891,694 A | 1/1990 | Way |

| | | | | | |
|---|---|---|---|---|---|
| 4,893,326 A | 1/1990 | Duran et al. | 5,452,289 A | 9/1995 | Sharma et al. |
| 4,896,349 A | 1/1990 | Kubo et al. | 5,463,616 A | 10/1995 | Kruse et al. |
| 4,901,218 A | 2/1990 | Cornwell | 5,473,517 A | 12/1995 | Blackmon |
| 4,901,342 A | 2/1990 | Jones | 5,489,894 A | 2/1996 | Murray |
| 4,912,721 A | 3/1990 | Pidgeon, Jr. et al. | 5,499,241 A | 3/1996 | Thompson et al. |
| 4,918,688 A | 4/1990 | Krause et al. | 5,500,794 A | 3/1996 | Fujita |
| 4,924,349 A | 5/1990 | Buehler et al. | 5,521,631 A | 5/1996 | Budow et al. |
| 4,924,492 A | 5/1990 | Gitlin et al. | 5,530,737 A | 6/1996 | Bartholomew et al. |
| 4,932,022 A | 6/1990 | Keeney et al. | 5,533,101 A | 7/1996 | Miyagawa |
| 4,932,047 A | 6/1990 | Emmons et al. | 5,539,449 A | 7/1996 | Blahut et al. |
| 4,937,819 A | 6/1990 | King | 5,539,821 A | 7/1996 | Blonder |
| 4,945,404 A | 7/1990 | Miller | 5,539,880 A | 7/1996 | Lakhani |
| 4,947,483 A | 8/1990 | Dirr | 5,548,592 A | 8/1996 | Komarek et al. |
| 4,949,187 A | 8/1990 | Cohen | 5,550,836 A | 8/1996 | Albrecht et al. |
| 4,953,160 A | 8/1990 | Gupta | 5,553,063 A | 9/1996 | Dickson |
| 4,954,886 A | 9/1990 | Elberbaum | 5,563,782 A | 10/1996 | Chen et al. |
| 4,955,048 A | 9/1990 | Iwamura et al. | 5,566,233 A | 10/1996 | Liu |
| 4,969,136 A | 11/1990 | Chamberlin et al. | 5,569,209 A | 10/1996 | Reitman |
| 4,975,896 A | 12/1990 | D'Agosto, III et al. | 5,570,355 A | 10/1996 | Dail et al. |
| 4,975,906 A | 12/1990 | Takiyasu et al. | 5,574,256 A | 11/1996 | Cottone |
| 4,979,028 A | 12/1990 | Minematsu et al. | 5,574,964 A | 11/1996 | Hamlin |
| 4,985,892 A | 1/1991 | Camarata | 5,581,555 A | 12/1996 | Dubberly et al. |
| 4,989,081 A | 1/1991 | Miyagawa et al. | 5,585,837 A | 12/1996 | Nixon |
| 4,994,908 A | 2/1991 | Kuban et al. | 5,586,121 A | 12/1996 | Moura et al. |
| 4,996,709 A | 2/1991 | Heep et al. | 5,587,692 A | 12/1996 | Graham et al. |
| 5,010,399 A | 4/1991 | Goodman | 5,590,173 A | 12/1996 | Beasley |
| 5,022,069 A | 6/1991 | Chen | 5,592,540 A | 1/1997 | Beveridge |
| 5,023,868 A | 6/1991 | Davidson et al. | 5,594,726 A | 1/1997 | Thompson et al. |
| 5,027,426 A | 6/1991 | Chiocca, Jr. | 5,596,631 A | 1/1997 | Chen |
| 5,034,948 A | 7/1991 | Mizutani et al. | 5,604,737 A | 2/1997 | Iwami et al. |
| 5,036,513 A | 7/1991 | Greenblatt | 5,604,791 A | 2/1997 | Lee |
| 5,042,028 A | 8/1991 | Ogawa | 5,610,916 A | 3/1997 | Kostreski et al. |
| 5,051,822 A | 9/1991 | Rhoades | 5,613,190 A | 3/1997 | Hylton |
| 5,066,939 A | 11/1991 | Mansfield, Jr. | 5,613,191 A | 3/1997 | Hylton |
| 5,070,522 A | 12/1991 | Nilssen | 5,619,251 A | 4/1997 | Kuroiwa et al. |
| 5,089,886 A | 2/1992 | Grandmougin | 5,619,252 A | 4/1997 | Nakano |
| 5,090,052 A | 2/1992 | Nakajima et al. | 5,621,455 A | 4/1997 | Rogers et al. |
| 5,095,497 A | 3/1992 | Aman et al. | 5,623,537 A | 4/1997 | Ensor et al. |
| 5,111,497 A | 5/1992 | Bliven et al. | 5,625,863 A | 4/1997 | Abraham |
| 5,114,365 A | 5/1992 | Thompson | 5,627,827 A | 5/1997 | Dale et al. |
| 5,127,003 A | 6/1992 | Doll, Jr. et al. | 5,634,191 A | 5/1997 | Beasley |
| 5,140,630 A | 8/1992 | Fry et al. | 5,642,155 A | 6/1997 | Cheng |
| 5,142,568 A | 8/1992 | Ogata et al. | 5,646,983 A | 7/1997 | Suffern et al. |
| 5,150,365 A | 9/1992 | Hirata et al. | 5,666,293 A | 9/1997 | Metz et al. |
| 5,151,838 A | 9/1992 | Dockery | 5,668,857 A | 9/1997 | McHale |
| 5,192,231 A | 3/1993 | Dolin | 5,671,220 A | 9/1997 | Tonomura |
| 5,239,540 A | 8/1993 | Rovira et al. | 5,675,375 A | 10/1997 | Riffee |
| 5,243,627 A | 9/1993 | Betts et al. | 5,696,790 A | 12/1997 | Graham et al. |
| 5,247,347 A | 9/1993 | Litteral et al. | 5,705,974 A | 1/1998 | Patel et al. |
| 5,255,267 A | 10/1993 | Hansen et al. | 5,708,701 A | 1/1998 | Houvig et al. |
| 5,257,006 A | 10/1993 | Graham et al. | 5,708,705 A | 1/1998 | Yamashita |
| 5,274,631 A | 12/1993 | Bhardwaj | 5,712,614 A | 1/1998 | Patel et al. |
| 5,278,889 A | 1/1994 | Papanicolaou et al. | 5,719,858 A | 2/1998 | Moore |
| 5,283,637 A | 2/1994 | Goolcharan | 5,719,872 A | 2/1998 | Dubberly et al. |
| 5,305,312 A | 4/1994 | Fornek et al. | 5,729,824 A | 3/1998 | O'Neill et al. |
| 5,319,634 A | 6/1994 | Bartholomew et al. | RE35,774 E | 4/1998 | Moura et al. |
| 5,321,736 A | 6/1994 | Beasley | 5,736,965 A | 4/1998 | Mosebrook et al. |
| 5,321,846 A | 6/1994 | Yokota et al. | 5,737,333 A | 4/1998 | Civanlar et al. |
| 5,334,975 A | 8/1994 | Wachob et al. | 5,742,596 A | 4/1998 | Baratz et al. |
| 5,341,415 A | 8/1994 | Baran | 5,745,837 A | 4/1998 | Fuhrmann |
| 5,343,240 A | 8/1994 | Yu | 5,754,539 A | 5/1998 | Metz et al. |
| 5,353,334 A | 10/1994 | O'Sullivan | 5,757,803 A | 5/1998 | Russell et al. |
| 5,363,432 A | 11/1994 | Martin et al. | 5,757,936 A | 5/1998 | Lee |
| 5,379,005 A | 1/1995 | Aden et al. | 5,760,822 A | 6/1998 | Coutinho |
| 5,381,459 A | 1/1995 | Lappington | 5,764,743 A | 6/1998 | Goedken et al. |
| 5,402,902 A | 4/1995 | Bouley | 5,767,895 A | 6/1998 | Yashiro et al. |
| 5,408,260 A | 4/1995 | Arnon | 5,774,526 A | 6/1998 | Propp et al. |
| 5,410,343 A | 4/1995 | Coddington et al. | 5,777,769 A | 7/1998 | Coutinho |
| 5,418,559 A | 5/1995 | Blahut | 5,778,303 A | 7/1998 | Shinozaki et al. |
| 5,421,030 A | 5/1995 | Baran | 5,787,115 A | 7/1998 | Turnbull et al. |
| 5,432,838 A | 7/1995 | Purchase et al. | 5,793,265 A | 8/1998 | Spielman |
| 5,440,335 A | 8/1995 | Beveridge | 5,793,413 A | 8/1998 | Hylton et al. |
| 5,448,635 A | 9/1995 | Biehl et al. | 5,796,739 A | 8/1998 | Kim et al. |

| | | | | | | |
|---|---|---|---|---|---|---|
| 5,801,635 A | 9/1998 | Price | 6,010,228 A | 1/2000 | Blackman | |
| 5,802,173 A | 9/1998 | Hamilton-Piercy et al. | 6,014,386 A * | 1/2000 | Abraham | 370/485 |
| 5,802,177 A | 9/1998 | Daniel et al. | 6,026,150 A | 2/2000 | Frank | |
| 5,802,283 A | 9/1998 | Grady et al. | 6,028,860 A | 2/2000 | Laubach et al. | |
| 5,805,591 A | 9/1998 | Naboulsi et al. | 6,029,047 A | 2/2000 | Ishida et al. | |
| 5,805,806 A | 9/1998 | McArthur | 6,032,057 A | 2/2000 | Kiiski | |
| 5,809,431 A | 9/1998 | Bustamante et al. | 6,038,425 A | 3/2000 | Jeffrey | |
| 5,812,184 A | 9/1998 | Martinez | 6,040,759 A | 3/2000 | Sanderson | |
| 5,812,786 A | 9/1998 | Seazholtz et al. | 6,047,055 A | 4/2000 | Carkner et al. | |
| 5,818,845 A | 10/1998 | Moura et al. | 6,049,531 A | 4/2000 | Roy | |
| 5,822,677 A | 10/1998 | Peyrovian | 6,052,380 A | 4/2000 | Bell | |
| 5,822,678 A | 10/1998 | Evanyk | 6,055,242 A | 4/2000 | Doshi et al. | |
| 5,826,196 A | 10/1998 | Cuthrell | 6,055,435 A | 4/2000 | Smith et al. | |
| 5,833,350 A | 11/1998 | Moreland | 6,061,261 A | 5/2000 | Chen et al. | |
| 5,838,777 A | 11/1998 | Chang et al. | 6,061,357 A | 5/2000 | Olshansky et al. | |
| 5,841,360 A | 11/1998 | Binder | 6,061,392 A | 5/2000 | Bremer et al. | |
| 5,841,840 A | 11/1998 | Smith et al. | 6,064,422 A | 5/2000 | Goolcharan et al. | |
| 5,841,841 A | 11/1998 | Dodds et al. | 6,069,588 A | 5/2000 | O'Neill, Jr. | |
| 5,842,111 A | 11/1998 | Byers | 6,069,890 A | 5/2000 | White et al. | |
| 5,845,190 A | 12/1998 | Bushue et al. | 6,069,899 A | 5/2000 | Foley | |
| 5,847,751 A | 12/1998 | Safadi | 6,075,784 A | 6/2000 | Frankel et al. | |
| 5,848,054 A | 12/1998 | Mosebrook et al. | 6,075,787 A | 6/2000 | Bobeck et al. | |
| 5,848,150 A | 12/1998 | Bingel | 6,081,519 A | 6/2000 | Petler | |
| 5,852,631 A | 12/1998 | Scott | 6,081,533 A | 6/2000 | Laubach et al. | |
| 5,870,513 A | 2/1999 | Williams | 6,087,860 A | 7/2000 | Liu et al. | |
| 5,878,047 A | 3/1999 | Ganek et al. | 6,088,368 A | 7/2000 | Rubinstain et al. | |
| 5,881,142 A | 3/1999 | Frankel et al. | 6,088,569 A | 7/2000 | Bach et al. | |
| 5,886,732 A | 3/1999 | Humpleman | 6,091,932 A | 7/2000 | Langlais | |
| 5,889,765 A | 3/1999 | Gibbs | 6,094,441 A | 7/2000 | Jung et al. | |
| 5,889,856 A | 3/1999 | O'Toole et al. | 6,097,801 A | 8/2000 | Williams et al. | |
| 5,892,764 A | 4/1999 | Riemann et al. | 6,101,228 A | 8/2000 | Hebron et al. | |
| 5,895,985 A | 4/1999 | Fischer | 6,101,341 A | 8/2000 | Manabe | |
| 5,896,443 A * | 4/1999 | Dichter | 379/93.08 | 6,104,727 A | 8/2000 | Moura et al. |
| 5,896,556 A | 4/1999 | Moreland et al. | 6,107,912 A | 8/2000 | Bullock et al. | |
| 5,903,572 A | 5/1999 | Wright et al. | 6,108,331 A | 8/2000 | Thompson | |
| 5,903,643 A | 5/1999 | Bruhnke | 6,115,755 A | 9/2000 | Krishan | |
| 5,905,781 A | 5/1999 | McHale et al. | 6,123,577 A | 9/2000 | Contois et al. | |
| 5,905,786 A | 5/1999 | Hoopes | 6,128,471 A | 10/2000 | Quelch et al. | |
| 5,911,119 A | 6/1999 | Bartholomew et al. | 6,130,893 A | 10/2000 | Whittaker et al. | |
| 5,911,123 A | 6/1999 | Shaffer et al. | 6,134,235 A | 10/2000 | Goldman et al. | |
| 5,912,895 A | 6/1999 | Terry et al. | 6,134,308 A | 10/2000 | Fallon et al. | |
| 5,917,624 A | 6/1999 | Wagner | 6,137,793 A | 10/2000 | Gorman et al. | |
| 5,923,361 A | 7/1999 | Sutton, Jr. | 6,137,865 A | 10/2000 | Ripy et al. | |
| 5,926,479 A | 7/1999 | Baran | 6,141,356 A | 10/2000 | Gorman | |
| 5,930,340 A | 7/1999 | Bell | 6,144,399 A | 11/2000 | Manchester et al. | |
| 5,936,660 A | 8/1999 | Gurantz | 6,154,465 A | 11/2000 | Pickett | |
| 5,936,952 A | 8/1999 | Lecomte | 6,157,292 A | 12/2000 | Piercy et al. | |
| 5,937,055 A | 8/1999 | Kaplan | 6,157,645 A | 12/2000 | Shobatake | |
| 5,940,479 A | 8/1999 | Guy et al. | 6,160,880 A | 12/2000 | Allen | |
| 5,943,404 A | 8/1999 | Sansom et al. | 6,161,134 A | 12/2000 | Wang et al. | |
| 5,946,047 A | 8/1999 | Levan | 6,166,730 A | 12/2000 | Goode et al. | |
| 5,946,048 A | 8/1999 | Levan | 6,167,043 A | 12/2000 | Frantz | |
| 5,949,476 A | 9/1999 | Pocock et al. | 6,167,120 A | 12/2000 | Kikinis | |
| 5,953,344 A | 9/1999 | Dail et al. | 6,169,795 B1 | 1/2001 | Dunn et al. | |
| 5,953,670 A | 9/1999 | Newson | 6,181,715 B1 | 1/2001 | Phillips et al. | |
| 5,960,066 A | 9/1999 | Hartmann et al. | 6,188,557 B1 | 2/2001 | Chaudhry | |
| 5,963,539 A | 10/1999 | Webber, Jr. et al. | 6,188,871 B1 | 2/2001 | Kitamura et al. | |
| 5,963,595 A | 10/1999 | Graham et al. | 6,192,399 B1 | 2/2001 | Goodman | |
| 5,963,620 A | 10/1999 | Frankel et al. | 6,202,211 B1 | 3/2001 | Williams, Jr. | |
| 5,963,844 A | 10/1999 | Dail | 6,207,895 B1 | 3/2001 | Engel | |
| 5,968,118 A | 10/1999 | Sutton, Jr. | 6,208,637 B1 | 3/2001 | Eames | |
| 5,970,127 A | 10/1999 | Smith et al. | 6,212,227 B1 | 4/2001 | Ko et al. | |
| 5,982,363 A | 11/1999 | Naiff | 6,215,789 B1 | 4/2001 | Keenan et al. | |
| 5,982,784 A | 11/1999 | Bell | 6,215,799 B1 | 4/2001 | Mitchell et al. | |
| 5,982,854 A | 11/1999 | Ehreth | 6,216,160 B1 | 4/2001 | Dichter | |
| 5,987,303 A | 11/1999 | Dutta et al. | 6,216,171 B1 | 4/2001 | Isono et al. | |
| 5,991,311 A | 11/1999 | Long et al. | 6,219,409 B1 | 4/2001 | Smith et al. | |
| 5,995,598 A | 11/1999 | Berstis | 6,222,124 B1 | 4/2001 | Pritchard | |
| 5,999,612 A | 12/1999 | Dunn et al. | 6,222,853 B1 | 4/2001 | Mesttinen | |
| 6,002,722 A | 12/1999 | Wu | 6,236,653 B1 | 5/2001 | Dalton et al. | |
| 6,005,873 A | 12/1999 | Amit | 6,240,166 B1 | 5/2001 | Collin et al. | |
| 6,009,041 A | 12/1999 | Rolandi et al. | 6,243,413 B1 | 6/2001 | Beukema | |
| 6,009,465 A | 12/1999 | Decker et al. | 6,243,571 B1 | 6/2001 | Bullock | |

| | | |
|---|---|---|
| 6,252,754 B1 | 6/2001 | Chaudhry |
| 6,259,775 B1 | 7/2001 | Alpert et al. |
| 6,272,209 B1 | 8/2001 | Bridger et al. |
| 6,282,075 B1 | 8/2001 | Chaudhry |
| 6,282,238 B1 | 8/2001 | Landry |
| 6,282,277 B1 | 8/2001 | DeBalko |
| 6,292,467 B1 | 9/2001 | Keller |
| 6,292,517 B1 | 9/2001 | Jeffress et al. |
| 6,297,450 B1 | 10/2001 | Yu |
| 6,307,862 B1 | 10/2001 | Silverman |
| 6,310,894 B1 | 10/2001 | Counterman |
| 6,310,940 B1 | 10/2001 | Ratz |
| 6,317,884 B1 | 11/2001 | Eames et al. |
| 6,320,900 B1 | 11/2001 | Liu |
| 6,324,268 B1 | 11/2001 | Balachandran et al. |
| 6,334,219 B1 | 12/2001 | Hill et al. |
| 6,339,594 B1 | 1/2002 | Civanlar et al. |
| 6,345,047 B1 | 2/2002 | Regnier |
| 6,349,098 B1 | 2/2002 | Parruck et al. |
| 6,349,133 B1 | 2/2002 | Matthews et al. |
| 6,362,987 B1 | 3/2002 | Yurek et al. |
| 6,364,535 B1 | 4/2002 | Coffey |
| 6,370,149 B1 | 4/2002 | Gorman et al. |
| 6,380,852 B1 | 4/2002 | Hartman et al. |
| 6,381,745 B1 | 4/2002 | Paul |
| 6,389,125 B1 | 5/2002 | Ubowski |
| 6,393,050 B1 | 5/2002 | Liu |
| 6,396,391 B1 | 5/2002 | Binder |
| 6,396,393 B2 | 5/2002 | Yuasa |
| 6,400,815 B1 | 6/2002 | Gilboy et al. |
| 6,404,773 B1 | 6/2002 | Williams et al. |
| 6,405,027 B1 | 6/2002 | Bell |
| 6,414,952 B2 | 7/2002 | Foley |
| 6,418,149 B1 | 7/2002 | Swisher et al. |
| 6,420,964 B1 | 7/2002 | Nishikaws |
| 6,424,661 B1 | 7/2002 | Bentley |
| 6,426,942 B1 | 7/2002 | Sienel et al. |
| 6,427,237 B1 | 7/2002 | Aranguren et al. |
| 6,430,199 B1 | 8/2002 | Kerpez |
| 6,433,672 B1 | 8/2002 | Shirmard |
| 6,434,123 B1 | 8/2002 | Park |
| 6,438,109 B1 | 8/2002 | Karaoguz et al. |
| 6,441,723 B1 | 8/2002 | Mansfield, Jr. et al. |
| 6,448,899 B1 | 9/2002 | Thompson |
| 6,449,291 B1 | 9/2002 | Burns et al. |
| 6,449,318 B1 | 9/2002 | Rumbaugh |
| 6,449,348 B1 | 9/2002 | Lamb et al. |
| 6,452,923 B1 | 9/2002 | Gerszberg et al. |
| 6,453,473 B1 | 9/2002 | Watson, Jr. |
| 6,459,692 B1 | 10/2002 | Ben-Michael et al. |
| 6,463,588 B1 | 10/2002 | Jenkins et al. |
| 6,466,572 B1 | 10/2002 | Ethridge et al. |
| 6,470,053 B1 | 10/2002 | Liu |
| 6,473,495 B1 | 10/2002 | Willer |
| 6,474,829 B2 | 11/2002 | Clodfelter |
| 6,475,022 B2 | 11/2002 | Tamino |
| 6,480,510 B1 | 11/2002 | Binder |
| 6,481,013 B1 | 11/2002 | Dinwiddie et al. |
| 6,483,902 B1 | 11/2002 | Stewart et al. |
| 6,492,897 B1 | 12/2002 | Mowerly |
| 6,493,325 B1 | 12/2002 | Hjalmtysson et al. |
| 6,493,875 B1 | 12/2002 | Eames et al. |
| 6,507,322 B2 | 1/2003 | Fang |
| 6,507,647 B1 | 1/2003 | Mandalia |
| 6,513,163 B1 | 1/2003 | Silvia et al. |
| 6,518,724 B2 | 2/2003 | Janik |
| 6,519,283 B1 | 2/2003 | Cheney et al. |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,581 B1 | 2/2003 | Edson |
| 6,532,279 B1 | 3/2003 | Goodman |
| 6,532,280 B1 | 3/2003 | McDonald |
| 6,535,480 B1 | 3/2003 | Bhagavath et al. |
| 6,535,587 B1 | 3/2003 | Kobayashi |
| 6,539,011 B1 | 3/2003 | Keenan et al. |
| 6,543,940 B2 | 4/2003 | Chu |
| 6,546,017 B1 | 4/2003 | Khaunte |
| 6,546,098 B1 | 4/2003 | Henderson |
| 6,549,616 B1 | 4/2003 | Binder |
| 6,553,568 B1 | 4/2003 | Fijolek et al. |
| 6,556,564 B2 | 4/2003 | Rogers |
| 6,556,581 B1 | 4/2003 | He et al. |
| 6,560,225 B1 | 5/2003 | Czajkowski et al. |
| 6,560,319 B1 | 5/2003 | Binder |
| 6,563,816 B1 | 5/2003 | Nodoushani et al. |
| 6,567,981 B1 | 5/2003 | Jeffrey |
| 6,570,869 B1 | 5/2003 | Shankar et al. |
| 6,570,890 B1 | 5/2003 | Keenan et al. |
| 6,572,384 B1 | 6/2003 | Marchevsky |
| 6,574,242 B1 | 6/2003 | Keenan et al. |
| 6,574,313 B1 | 6/2003 | Chea, Jr. et al. |
| 6,577,631 B1 | 6/2003 | Keenan et al. |
| 6,577,642 B1 | 6/2003 | Fijolek et al. |
| 6,580,710 B1 | 6/2003 | Bowen et al. |
| 6,580,785 B2 | 6/2003 | Bremer et al. |
| 6,581,208 B1 | 6/2003 | Inaguma |
| 6,584,122 B1 | 6/2003 | Matthews et al. |
| 6,584,148 B1 | 6/2003 | Zitting et al. |
| 6,587,454 B1 | 7/2003 | Lamb |
| 6,587,473 B2 | 7/2003 | Terry et al. |
| 6,587,479 B1 | 7/2003 | Bianchi et al. |
| 6,600,734 B1 | 7/2003 | Gernert et al. |
| 6,601,097 B1 | 7/2003 | Cheston et al. |
| 6,603,808 B1 | 8/2003 | Anne et al. |
| 6,608,894 B1 | 8/2003 | Armenta |
| 6,611,537 B1 | 8/2003 | Edens et al. |
| 6,615,407 B1 | 9/2003 | Inaguma |
| 6,618,353 B2 | 9/2003 | Merrill et al. |
| 6,618,387 B1 | 9/2003 | Liu et al. |
| 6,622,304 B1 | 9/2003 | Carhart |
| 6,637,030 B1 | 10/2003 | Klein |
| 6,653,932 B1 | 11/2003 | Beamish et al. |
| 6,657,994 B1 | 12/2003 | Rajakarunanayake |
| 6,658,010 B1 | 12/2003 | Enns et al. |
| 6,678,321 B1 | 1/2004 | Graham et al. |
| 6,678,721 B1 | 1/2004 | Bell |
| 6,686,832 B2 | 2/2004 | Abraham |
| 6,690,677 B1 | 2/2004 | Binder |
| 6,693,916 B1 | 2/2004 | Chaplik et al. |
| 6,697,358 B2 | 2/2004 | Bernstein |
| 6,697,864 B1 | 2/2004 | Demirtjis et al. |
| 6,700,970 B1 | 3/2004 | Aronson et al. |
| 6,701,406 B1 | 3/2004 | Chang et al. |
| 6,704,414 B2 | 3/2004 | Murakoshi |
| 6,710,553 B2 | 3/2004 | Lagan |
| 6,711,138 B1 | 3/2004 | Pai et al. |
| 6,721,298 B1 | 4/2004 | Vella-Coleiro |
| 6,721,365 B1 | 4/2004 | Yin et al. |
| 6,721,419 B1 | 4/2004 | Stell et al. |
| 6,721,790 B1 | 4/2004 | Chen |
| 6,731,627 B1 | 5/2004 | Gupta et al. |
| 6,732,315 B2 | 5/2004 | Yagil et al. |
| 6,732,368 B1 | 5/2004 | Michael et al. |
| 6,735,217 B1 | 5/2004 | Webber, Jr. et al. |
| 6,738,382 B1 | 5/2004 | West et al. |
| 6,738,470 B1 | 5/2004 | Aronovitz |
| 6,738,597 B1 | 5/2004 | Jeung et al. |
| 6,745,392 B1 | 6/2004 | Basawapatna et al. |
| 6,747,859 B2 | 6/2004 | Walbeck et al. |
| 6,747,995 B1 | 6/2004 | Brown et al. |
| 6,748,080 B2 | 6/2004 | Russ et al. |
| 6,751,212 B1 | 6/2004 | Kaji et al. |
| 6,751,441 B1 | 6/2004 | Murray et al. |
| 6,754,186 B1 | 6/2004 | Bullman |

| | | | | | | |
|---|---|---|---|---|---|---|
| 6,759,946 B2 | 7/2004 | Sahinoglu et al. | 6,980,638 B1 | 12/2005 | Smith et al. | |
| 6,760,384 B1 | 7/2004 | Garreau et al. | 6,981,892 B1 | 1/2006 | Kostalnik | |
| 6,763,097 B1 | 7/2004 | Vitenberg | 6,985,714 B2 | 1/2006 | Akiyama et al. | |
| 6,765,149 B1 | 7/2004 | Ku | 6,989,733 B2 | 1/2006 | Simonsen et al. | |
| 6,765,931 B1 | 7/2004 | Rabenko et al. | 6,993,289 B2 | 1/2006 | Janik | |
| 6,771,750 B1 | 8/2004 | Nayler et al. | 6,995,657 B2 | 2/2006 | Zalitzky et al. | |
| 6,771,773 B1 | 8/2004 | Hanrieder et al. | 6,996,134 B1 | 2/2006 | Renucci et al. | |
| 6,771,774 B1 | 8/2004 | Phan et al. | 6,996,213 B1 | 2/2006 | De Jong | |
| 6,773,632 B1 | 8/2004 | Marshall et al. | 6,996,729 B2 | 2/2006 | Volkening et al. | |
| 6,775,269 B1 | 8/2004 | Kaczmarczyk et al. | 6,996,837 B1 | 2/2006 | Miura et al. | |
| 6,778,549 B1 | 8/2004 | Keller | 6,998,964 B2 | 2/2006 | Lomax, Jr. et al. | |
| 6,778,646 B1 | 8/2004 | Sun | 7,002,898 B1 | 2/2006 | Lou | |
| 6,778,817 B1 | 8/2004 | Bullock et al. | 7,003,102 B2 | 2/2006 | Kiko | |
| 6,781,530 B2 | 8/2004 | Moore | 7,009,946 B1 | 3/2006 | Kardach | |
| 6,785,296 B1 | 8/2004 | Bell | 7,010,002 B2 | 3/2006 | Chow et al. | |
| 6,788,782 B1 | 9/2004 | Fotsch et al. | 7,012,922 B1 | 3/2006 | Unitt et al. | |
| 6,792,323 B2 | 9/2004 | Krzyzanowski et al. | 7,016,377 B1 | 3/2006 | Chun et al. | |
| 6,798,767 B1 | 9/2004 | Alexande et al. | 7,020,130 B2 | 3/2006 | Krause et al. | |
| 6,804,234 B1 | 10/2004 | Chow | 7,023,809 B1 | 4/2006 | Rubenstein | |
| 6,819,682 B1 | 11/2004 | Rabenko et al. | 7,023,868 B2 | 4/2006 | Rabenko et al. | |
| 6,819,760 B1 | 11/2004 | Nayler | 7,027,483 B2 | 4/2006 | Santhoff | |
| 6,823,047 B1 | 11/2004 | Cruickshank | 7,027,566 B2 | 4/2006 | Bossemeyer, Jr. et al. | |
| 6,826,174 B1 | 11/2004 | Erekson et al. | 7,031,394 B2 | 4/2006 | Vitenberg | |
| 6,831,975 B1 | 12/2004 | Easwaran et al. | 7,034,225 B2 | 4/2006 | Thompson | |
| 6,834,057 B1 | 12/2004 | Rabenko et al. | 7,035,270 B2 | 4/2006 | Moore, Jr. et al. | |
| 6,836,546 B1 | 12/2004 | Willer | 7,036,140 B2 | 4/2006 | Terry et al. | |
| 6,838,997 B1 | 1/2005 | Davidson | 7,047,555 B1 | 5/2006 | Inaguma et al. | |
| 6,839,345 B2 | 1/2005 | Lu et al. | 7,054,303 B2 | 5/2006 | Miyazaki et al. | |
| 6,842,459 B1 | 1/2005 | Binder | 7,058,174 B2 | 6/2006 | Posthuma | |
| 6,847,718 B1 | 1/2005 | Hiraoka | 7,068,668 B2 | 6/2006 | Feuer | |
| 6,848,116 B1 | 1/2005 | Land | 7,082,141 B2 | 7/2006 | Sharma et al. | |
| 6,854,895 B2 | 2/2005 | Coffey et al. | 7,088,238 B2 | 8/2006 | Karaoguz et al. | |
| 6,856,616 B1 | 2/2005 | Schuster et al. | 7,095,849 B2 | 8/2006 | Smith et al. | |
| 6,856,799 B1 | 2/2005 | Ritter | 7,099,368 B2 | 8/2006 | Santhoff et al. | |
| 6,857,132 B1 | 2/2005 | Rakib et al. | 7,106,388 B2 | 9/2006 | Vorenkamp et al. | |
| 6,862,353 B2 | 3/2005 | Rabenko et al. | 7,106,721 B1 | 9/2006 | Binder | |
| 6,864,798 B2 | 3/2005 | Janik | 7,113,574 B1 | 9/2006 | Haas et al. | |
| 6,865,193 B2 | 3/2005 | Terk | 7,116,685 B2 | 10/2006 | Brown et al. | |
| 6,868,058 B1 | 3/2005 | Cooper et al. | 7,117,520 B2 | 10/2006 | Stewart | |
| 6,868,072 B1 | 3/2005 | Lin et al. | 7,138,886 B2 | 11/2006 | Strull et al. | |
| 6,868,081 B1 | 3/2005 | Akram et al. | 7,142,560 B2 | 11/2006 | Mansfield | |
| 6,868,265 B2 | 3/2005 | Zodnik | 7,142,563 B1 | 11/2006 | Lin | |
| 6,876,648 B1 | 4/2005 | Lee | 7,142,934 B2 | 11/2006 | Janik | |
| 6,880,020 B1 | 4/2005 | Rubinstein et al. | 7,149,182 B1 | 12/2006 | Renucci et al. | |
| 6,882,714 B2 | 4/2005 | Mansfield | 7,149,474 B1 | 12/2006 | Mikhak | |
| 6,898,413 B2 | 5/2005 | Yip et al. | 7,151,575 B1 | 12/2006 | Landry et al. | |
| 6,901,439 B1 | 5/2005 | Bonasia et al. | 7,154,996 B2 | 12/2006 | Strauss | |
| 6,904,134 B2 | 6/2005 | Jeon et al. | 7,162,013 B2 | 1/2007 | Gavette et al. | |
| 6,907,458 B2 | 6/2005 | Tamassetti | 7,164,690 B2 | 1/2007 | Limb et al. | |
| 6,909,725 B1 | 6/2005 | Chow | 7,171,506 B2 | 1/2007 | Iwamura | |
| 6,912,209 B1 | 6/2005 | Thi et al. | 7,199,706 B2 | 4/2007 | Dawson et al. | |
| 6,922,407 B2 | 7/2005 | Wu | 7,206,322 B1 | 4/2007 | Garg et al. | |
| 6,925,089 B2 | 8/2005 | Chow et al. | 7,206,417 B2 | 4/2007 | Nathan | |
| 6,927,340 B1 | 8/2005 | Binder | 7,209,497 B2 | 4/2007 | Weinstein et al. | |
| 6,931,659 B1 | 8/2005 | Kinemura | 7,209,719 B2 | 4/2007 | Liebenow | |
| 6,932,624 B1 | 8/2005 | Hoopes | 7,239,628 B1 | 7/2007 | Pendleton et al. | |
| 6,933,686 B1 | 8/2005 | Bishel | 7,257,106 B2 | 8/2007 | Chen et al. | |
| 6,934,300 B2 | 8/2005 | Tamasetti | 7,274,669 B2 | 9/2007 | Czerwiec et al. | |
| 6,934,754 B2 | 8/2005 | West et al. | 7,295,518 B1 | 11/2007 | Monk et al. | |
| 6,937,056 B2 | 8/2005 | Binder | 7,301,940 B1 | 11/2007 | Bernstein | |
| 6,940,956 B1 | 9/2005 | Leach | 7,346,071 B2 | 3/2008 | Bareis | |
| 6,941,364 B2 | 9/2005 | Kim et al. | 7,382,786 B2 | 6/2008 | Chen et al. | |
| 6,941,576 B2 | 9/2005 | Amit | 2001/0030470 A1 | 10/2001 | Waugh | |
| 6,943,296 B2 | 9/2005 | Perret | 2001/0030950 A1 | 10/2001 | Chen et al. | |
| 6,943,683 B2 | 9/2005 | Perret | 2001/0036199 A1 | 11/2001 | Terry | |
| 6,946,988 B2 | 9/2005 | Edwards | 2001/0038635 A1 | 11/2001 | Rogers | |
| 6,947,736 B2 | 9/2005 | Shaver et al. | 2001/0039660 A1 | 11/2001 | Vasilevsky et al. | |
| 6,955,560 B1 | 10/2005 | Biggs | 2002/0003873 A1* | 1/2002 | Rabenko et al. | 379/413 |
| 6,956,826 B1 | 10/2005 | Binder | 2002/0006137 A1 | 1/2002 | Rabenko et al. | |
| 6,961,303 B1 | 11/2005 | Binder | 2002/0019875 A1 | 2/2002 | Garrett et al. | |
| 6,963,559 B2 | 11/2005 | Elo | 2002/0031114 A1 | 3/2002 | Terry et al. | |
| 6,963,931 B2 | 11/2005 | Bunn et al. | 2002/0035404 A1 | 3/2002 | Ficco et al. | |
| 6,975,713 B1 | 12/2005 | Smith et al. | 2002/0035624 A1 | 3/2002 | Kim | |

| | | | | | | |
|---|---|---|---|---|---|---|
| 2002/0037004 A1 | 3/2002 | Bossemeyer et al. | | 2005/0053087 A1 | 3/2005 | Pulyk |
| 2002/0038153 A1 | 3/2002 | Amodeo | | 2005/0073968 A1 | 4/2005 | Perlman |
| 2002/0039388 A1 | 4/2002 | Smart et al. | | 2005/0076148 A1 | 4/2005 | Chan et al. |
| 2002/0061012 A1 | 5/2002 | Thi et al. | | 2005/0076149 A1 | 4/2005 | McKown et al. |
| 2002/0063924 A1 | 5/2002 | Kimbrough et al. | | 2005/0084004 A1 | 4/2005 | Bione |
| 2002/0069417 A1 | 6/2002 | Kliger et al. | | 2005/0086389 A1 | 4/2005 | Chang |
| 2002/0075806 A1 | 6/2002 | Shalvi et al. | | 2005/0086694 A1 | 4/2005 | Hicks et al. |
| 2002/0104009 A1 | 8/2002 | Zodnik | | 2005/0114325 A1 | 5/2005 | Liu et al. |
| 2002/0116720 A1 | 8/2002 | Terry et al. | | 2005/0125083 A1 | 6/2005 | Kiko |
| 2002/0128009 A1 | 9/2002 | Boch et al. | | 2005/0136972 A1 | 6/2005 | Smith et al. |
| 2002/0131422 A1 | 9/2002 | Chu et al. | | 2005/0144647 A1 | 6/2005 | Zussman et al. |
| 2002/0144159 A1 | 10/2002 | Wu et al. | | 2005/0150100 A1 | 7/2005 | Merdan et al. |
| 2002/0150155 A1 | 10/2002 | Florentin et al. | | 2005/0152306 A1 | 7/2005 | Bonnassieux et al. |
| 2002/0166124 A1 | 11/2002 | Gurantz et al. | | 2005/0152337 A1 | 7/2005 | Wurtzel et al. |
| 2002/0166125 A1 | 11/2002 | Fulmer, II | | 2005/0177640 A1 | 8/2005 | Rubinstein et al. |
| 2002/0174423 A1 | 11/2002 | Fifield et al. | | 2005/0184915 A1 | 8/2005 | Nagel et al. |
| 2002/0176567 A1 | 11/2002 | Chen et al. | | 2005/0208825 A1 | 9/2005 | Chan |
| 2002/0194383 A1 | 12/2002 | Cohen et al. | | 2005/0226200 A1 | 10/2005 | Askildsen et al. |
| 2002/0194605 A1 | 12/2002 | Cohen et al. | | 2005/0228889 A1 | 10/2005 | Cohen et al. |
| 2002/0198952 A1 | 12/2002 | Bell | | 2005/0235333 A1 | 10/2005 | Bertonis et al. |
| 2003/0005450 A1 | 1/2003 | Smith | | 2005/0245127 A1 | 11/2005 | Nordin |
| 2003/0016794 A1 | 1/2003 | Brothers | | 2005/0272372 A1 | 12/2005 | Rodriguez |
| 2003/0018975 A1 | 1/2003 | Stone | | 2005/0273790 A1 | 12/2005 | Kearney |
| 2003/0039257 A1 | 2/2003 | Manis | | 2005/0281326 A1 | 12/2005 | Yu |
| 2003/0062990 A1 | 4/2003 | Schaeffer, Jr. et al. | | 2005/0289638 A1 | 12/2005 | Steading |
| 2003/0066082 A1 | 4/2003 | Kliger et al. | | 2006/0006817 A1 | 1/2006 | Chason |
| 2003/0067910 A1 | 4/2003 | Razazian et al. | | 2006/0079969 A1 | 4/2006 | Sequin |
| 2003/0088706 A1 | 5/2003 | Chan et al. | | 2006/0092967 A1 | 5/2006 | Bergeron et al. |
| 2003/0099228 A1 | 5/2003 | Alcock | | 2006/0104291 A1 | 5/2006 | Rodriguez |
| 2003/0106067 A1 | 6/2003 | Hoskins et al. | | 2006/0140178 A1 | 6/2006 | Cheng et al. |
| 2003/0112965 A1 | 6/2003 | McNamara et al. | | 2006/0153169 A1 | 7/2006 | Koifman et al. |
| 2003/0133476 A1 | 7/2003 | Stone et al. | | 2006/0193310 A1 | 8/2006 | Landry et al. |
| 2003/0151695 A1 | 8/2003 | Sahlin et al. | | 2006/0193313 A1 | 8/2006 | Landry et al. |
| 2003/0154273 A1 | 8/2003 | Caveney | | 2006/0193336 A1 | 8/2006 | Landry et al. |
| 2003/0154276 A1 | 8/2003 | Caveney | | 2006/0215680 A1 | 9/2006 | Camagna |
| 2003/0204393 A1 | 10/2003 | Czerwiec et al. | | 2006/0222086 A1 | 10/2006 | Frye |
| 2004/0006484 A1 | 1/2004 | Manis et al. | | 2006/0238250 A1 | 10/2006 | Camagna et al. |
| 2004/0013098 A1 | 1/2004 | Tseng et al. | | 2006/0251094 A1 | 11/2006 | Van Vleck et al. |
| 2004/0033817 A1 | 2/2004 | Gorsulch | | 2006/0251159 A1 | 11/2006 | Huotari et al. |
| 2004/0037317 A1 | 2/2004 | Zalitzky et al. | | 2006/0251179 A1 | 11/2006 | Ghoshal |
| 2004/0073597 A1 | 4/2004 | Caveney et al. | | 2006/0280197 A1 | 12/2006 | Stone |
| 2004/0077310 A1 | 4/2004 | Levy | | 2006/0291493 A1 | 12/2006 | Schley-May et al. |
| 2004/0083262 A1 | 4/2004 | Trantow | | 2006/0291575 A1 | 12/2006 | Berkman et al. |
| 2004/0085976 A1 | 5/2004 | Dale et al. | | 2007/0036171 A1 | 2/2007 | Magin |
| 2004/0087214 A1 | 5/2004 | Cho | | 2007/0198748 A1 | 8/2007 | Ametsitsi et al. |
| 2004/0090984 A1 | 5/2004 | Saint-Hilaire et al. | | 2008/0140565 A1 | 6/2008 | DeBenedetti et al. |
| 2004/0107299 A1 | 6/2004 | Lee et al. | | 2008/0153415 A1 | 6/2008 | Block et al. |
| 2004/0121648 A1 | 6/2004 | Voros | | | | |
| 2004/0123322 A1 | 6/2004 | Erkocevic et al. | | FOREIGN PATENT DOCUMENTS | | |
| 2004/0125819 A1 | 7/2004 | Binder | | | | |
| 2004/0136373 A1 | 7/2004 | Bareis | | CN | 1302493 | 7/2001 |
| 2004/0136384 A1 | 7/2004 | Cho | | EP | 0 241 152 A2 | 10/1987 |
| 2004/0147232 A1 | 7/2004 | Zodnik | | EP | 0385695 | 9/1990 |
| 2004/0156513 A1 | 8/2004 | Kaylor et al. | | EP | 0 961 466 | 12/1999 |
| 2004/0158649 A1 | 8/2004 | Ophir et al. | | EP | 1 075 103 A1 | 2/2001 |
| 2004/0170262 A1 | 9/2004 | Ohno | | EP | 1 343 253 A1 | 9/2003 |
| 2004/0177167 A1 | 9/2004 | Iwamura et al. | | GB | 2 368 979 A | 5/2002 |
| 2004/0177381 A1 | 9/2004 | Kliger et al. | | JP | 55-132197 A | 10/1980 |
| 2004/0178888 A1 | 9/2004 | Hales et al. | | JP | 59041883 | 3/1984 |
| 2004/0180573 A1 | 9/2004 | Chen | | JP | 3012378 | 2/1991 |
| 2004/0187156 A1 | 9/2004 | Palm et al. | | JP | 07320827 | 12/1995 |
| 2004/0198236 A1 | 10/2004 | Paine et al. | | JP | 2002367710 | 12/2002 |
| 2004/0203387 A1 | 10/2004 | Grannan | | WO | WO 95/19070 A1 | 7/1995 |
| 2004/0204017 A1 | 10/2004 | Eckel et al. | | WO | 9623377 A1 | 8/1996 |
| 2004/0204040 A1 | 10/2004 | Heijnen | | WO | WO 97/50193 A1 | 12/1997 |
| 2004/0208167 A1 | 10/2004 | Kishida | | WO | 98/27748 | 6/1998 |
| 2004/0255332 A1 | 12/2004 | Bertonis et al. | | WO | 98/31133 | 7/1998 |
| 2004/0268160 A1 | 12/2004 | Atkinson et al. | | WO | 99/35753 | 7/1999 |
| 2005/0015805 A1 | 1/2005 | Iwamura | | WO | WO 00/07322 | 2/2000 |
| 2005/0018766 A1 | 1/2005 | Iwamura | | WO | 00/28689 | 5/2000 |
| 2005/0034159 A1 | 2/2005 | Ophir et al. | | WO | WO 00/39948 A1 | 7/2000 |
| 2005/0038875 A1 | 2/2005 | Park | | WO | WO 0128215 | 4/2001 |
| 2005/0047379 A1 | 3/2005 | Boyden et al. | | WO | WO 01/43238 A1 | 6/2001 |

| WO | WO 01/71980 A1 | 9/2001 |
| WO | 01/80030 | 10/2001 |
| WO | 02/19623 | 3/2002 |
| WO | WO 02/091652 A2 | 11/2002 |
| WO | WO 02/102019 A2 | 12/2002 |
| WO | 2006/052216 | 5/2006 |

OTHER PUBLICATIONS

David Glick et al, Providing telco customers continuous data services, Telephony, vol. 205, No. 22, Nov. 1983, pp. 46,50,51,54.
John Hughes, et al, A Receiver IC For a 1+1 Digital Subscriber Loop, IEEE Journal of Solid State Circuity, vol. S.C. 20, No. 3, Jun. 1985 pp. 671-678.
Robert Jelski, Subscriber Subcarrier System—A New Life, Communciations International, vol. 4, No. 5, May 1977, pp. 29-30.
Arvind J. Karia et al, A Digital Subscriber Carrier System for the Envolving Subscriber Loop Network, vol. com 36, No. 9 Sep. 1982, pp. 2012, 2014, 2015.
T. Masuda et al, 2-Wire Video Intercom System with Telephone vol. 37. No. 6 Dec. 1991, pp. 74-80.
Tom Matthews, Telecomm System Is Nerve Center, Inforsystems, vol. 31, No. 5, May 1984, pp. 68-69.
Jack Merrow, A New Approach to Integrating Local Area Data and Voice Transmission, Telephony, vol. 250, No. 17, Oct. 1983, 2 pages.
Hank Morgan, Two-Wire Full-Duplex Modem Simplifires Voice and Data Networking, Mini-Micro Systems, vol. 17, No. 3 Mar. 1984, 4 pages.
R. Murakoshi., Home Automation, Journal of the Society of Instrument and Control Engineers, vol. 23, No. 11, Nov. 1984, pp. 955-958.
R.D. Nash et al, Simultaneous Transmission of Speech and Data Over An Analog Telephone Channel, GLOBECOM'85/ IEEE Global Telecommunication Conference. Communication Technology to Provide New Services, Dec. 25, 1985, New Orleans, Louisiana, pp. 4.2.1-4.2.4.
Haruo Ogiware et al., Design Phiosophy and Hardware Implementation for Digital Subscriber Loops, IEEE Transactions on Communications, vol. COM-30. No. 9, Sep. 1982, pp. 2057-2065.
Jean-Louis Pernin, Related Evolution of Subscriber Loop Plant and Residential Data Transmission Needs, Intelcon 79 Exposition Proceedings, Feb. 26-Mar. 2, 1979, Dallas, Texas, pp. 596-599.
Roger A. Tatum, Project Victoria-the 7-in-1 Solution, Telephone Engineer and Management, vol. 90, No. 1, Jan. 1, 1986, pp. 47, 50.
A. Teshima, et al., Still Video Telecommunication Over the Analog Telephone Network, Journal of the Institute of Television Engineers of Japan, vol. 42, No. 11, Nov. 1988, pp. 1162-1167.
S.R. Treves, Tex, Image and Data Integration in a Distributed Control Digital Voice Switching System, International Switching Symposium—ISS '81 CIC, Sep. 21-25, 1981, Montreal, Quebec, Canada, pp. 1-7.
Toru Tsuda, et al, Experimental In-house Multiservice Communication System, Fujitsu Scientific and Technical Journal, vol. 16, No. 3, Sep. 1980, pp. 29-45.
Klyoshi Urui, et al, Integrated Voice/Data Digital EPBX, Toshiba Review, No. 150, winter 1984, pp. 30-33.
A.F. Van Den Berg, et al., Principles van de Modem: Technieken en Specificaties, Elektronica, vol. 32, No. 5, Mar. 9, 1984, pp. 11, 13, 15, 17, 19 and 21.
M.G. Vry, Digital 1+1 Systems for Local Network Enhancement, Conference on Communications Equipment and Systems, Apr. 20-22, 1982, Birmingham, United Kingdom, pp. 61-64.
H. Nishi, et al., Control of a Sar/Bus Key Telephone System, NTT R & D, vol. 39. No. 8, 1990, pp. 122, 1222, 1224-12288.
A. Pietrasik, et al., Subscriber Carrier Telephony System 1+1, Wiadomosci Telekomunikacyjne, vol. 17, No. 7-8, Jul.-Aug. 1977, pp. 183-198.
V. Punj, Broadband Applications and Services of Public Switched Networks, IEEE Transactions on Consumer Electronics, vol. 35, No. 2, May 1989, pp. 106-112.
T. Sodeyama, et al., Intelligent House, Journal of the Institute of Electronics, Information and Communication Engineers, vol. 72, No. 9, Sep. 1989, pp. 1024-1026.
H. Tanaka, et al., Telecontrol System VJ-501, National Technical Report, vol. 32, No. 6, Dec. 1986, pp. 809-817.
D. L. Waring, The Asymmetrical Digital Subscriber Line (ADSL): A New Transport Technologhy for Delivering Wideband Capabilities to the Residence, Globecom '91 IEEE, pp. 1979-1986.
K. Yamamoto, et al., New Home Telephone System Using Japanese Home Bus System Standard, IEEE Transactions on COnsumer Electronics, vol. 35, No. 3, Aug. 1989, pp. 687-697.
T. Yamazaki, et al., Home Appliance Technologies, NEC Research and Development, No. 96, Mar. 1990, pp. 292-299.
CEBus: US Households are Being Networked, Funkschau, No. 9, Apr. 1989, pp. 45-47.
Shared Services (Data/Voice Network) Communications News, vol. 25, No. 11, Nov. 1988, pp. 46-47.
Freeman, Telecommunication Transmission Handbook, 2.sup.nd Ed., Cover, pp. xi-xxvii, Chapter 3 (pp. 79-127), Chapter 5 (pp. 172-252), Chapter 6 (pp. 253-288), 1981.
A. Artom et al., The possible Use of Customer Loop for New Services During the Trasition From Analogue to Digital, Revue F.I.T.C.E., Mar.-Apr. 1981 vol. 20, No. 2, pp. 50-56.
A. Artom et al., Medium-Term Prospects for New Services to the Telephone Customers, Conference Record, Jun. 14-18, 1981, Int'l Conf. on Communications, pp. 14.4.1-14.4-6, Denver, CO.
Hoe-Young Noh, Home Automation, Korea Infromation Science Society Review. Apr. 1989, vol. 7 No. 2, pp. 40-44, Republic of Korea.
M. Coronaro et al., Intergrated Office COmmunication System, Electrical Communication, 1986, pp. 17-22, bol. 60, No. 1, FACE Research Center, Pomezia, Italy.
Chow et al., A multi-drop In-House ADSL Distribution Network, IEEE 1994, pp. 456-460.
English Language Abstract for Japanese Patent 1-27358 (64-27358) Jan. 30, 1989.
Bellcore: Request for Information: Asymmetrical Digital Subscriber Line (ADSL) Systems That Support Simplex High-Bit-Rate Access and POTS in the Copper Loop Plant; Jun. 1991.
Mark Sumner: "DOCSIS 1.1 Overview" CABLEMODEM. COM—Documents, Online! May 3-7, 1999, pp. 1-16, XP-002165493, http://www.cablemodem.com/Euroll.sub.--Overview.pdf, retrieved on Apr. 18, 2001.
Sdralia et al, "Performance Characterisation of the MCNS DOCSIS 1.0 CATV Protocol with Prioritised First come First Served Scheduling", IEEE Transactions on Broadcasting, US, vol. 45, No. 2, Jun. 1999, pp. 196-205.
Tzerefos et al, "Delivery of Low Bit Rate Isochronous Streams Over the DOCSIS 1.0 Cable Television Protocol", IEEE Transactions on Broadcasting, US, vol. 45, No. 2, Jun. 1999, pp. 206-214.
A.D. Little, S. Lipoff: "Cable Modem Termination System—Network Side Interface Specification" Data Over Cable Interface Specification, Online 1996, pp. 1-17, XP002165494, http://www.cablemodem.com/SP.sub.--CMTS.sub.--NSII01-960702.pdf, retrieved on Apr. 18, 2001.
M. Laubach, "To foster residential area broadband internet techology: IP datagrams keep going, and going, and going . . . ", Computer Communications, NL, Elsevier Science Publishers BV, Amsterdam, vol. 19, No. 11, Sep. 1, 1996, pp. 867-875.
Goldberg, "MCNS/DOCSIS MAC Clears a Path for the Cable-Modem Invasion", Electronic Design, US, Penton Publishing, vol. 45, No. 27, Dec. 1, 1997, pp. 69-70, 74, 78, 80.
Quigley, "Cablemodem Standards for Advanced Quality of Service Deployments", Digest of Technical Papers, International Conference on Consumer Electronics, Jun. 22-24, 1999, pp. 282-283.
Cable Television Laboratories, Inc., "Data-Over-Cable Service Interface Specifications: Baseline Privacy Plus Interface Specification", SP-BPI+-I09-020830, Aug. 30, 2002.
Cable Television Laboratories, Inc., "Data-Over-Cable Service Interface Specifications: Radio Frequency Interface Specification", SP-RFIv1.1-I09-020830, Aug. 30, 2002.
Cable Television Laboratories, Inc., "Data-Over-Cable Service Interface Specifications: Radio Frequency Interface Specification", SP-RFIv2.0-I03-021218, Dec. 18, 2002.

Communications Technology, "Cable Modem Security: Insulating Your Network While Keeping Your Subscribers Safe from Each Other", Oct. 2001.

Croft et al, "Bootstrap Protocol (BOOTP)", Sep. 1985.

Droms, "Dynamic Host Configuration Protocol", Mar. 1997.

Jacobs, et al, "Bandwidth Burglary in Broad Daylight: How to Prevent a Simple Hack", Jan. 2003.

Pfendtner, "DOCSIS Network Security at WH-Netz", Nov. 20, 2002.

Society of Cable Telecommunications Engineers, Inc., "Data-Over-Cable Service Interface Specification: DOCSIS 1.0 Radio Frequency Interface (RFI)", ANSI/SCTE 22-1 2002 (formerly DSS 02-05).

"MCNS Data-Over-Cable Service Interface Specifications: Baseline Privacy Interface Specification SP-BPI-I02-990319", Mar. 1999.

Cable Television Laboratories, Inc.; Data-Over-Cable Service Interface Specifications—Radio Frequency Interface Specification—SP-RFI-I04-980724; 1997; pp. 1-196.

"MCNS Data-Over-Cable Service Interface Specifications: Cable Modem to Customer Premise Equipment Interface Specification SP-CMCI-I04-000714", Jul. 2000.

"Data-Over-Cable Service Interface Specifications: Cable Modem Termination System—Network Side Interface Specification, SP-CMTS-NSII01-960702", Jul. 1996.

Data-Over Cable Service Interface Specifications; Radio Frequency Interface Specification; SPRFIv1.1-I01-990311; 1999; Cable Television Laboratories, Inc.; pp. 1-310.

Ciciora, W., et al., "Protocol Issues," Modern Cable Television Technology: Video, Voice, and Data Communications, Section 4.4, pp. 194-205, Copyright 1999 by Morgan Kaufmann Publishers, Inc.

Ciciora, W., et al, "Chapter 4.5: The DOCSIS Protocol for Cable Modems," Modern Cable Television Technology: Video, Voice, and Data Communications, Section 4.5, pp. 205-213, Copyright 1999 by Morgan Kaufmann Publishers, Inc.

Data-Over Cable Service Interface Specifications; Operations Support System Interface Specification Baseline Privacy Interface MIB; SP-OSSI-BPI-I01-980331; 1997 & 1998; MCNS Holdings, LP; pp. 1-33.

On IEEE 802.14 Medium Access Control Protocol; Ying-Dar Lin; 1998.

On IEEE 802.14 Medium Access Control Protocol; Ying-Dar Lin; 1998; IEEE Communications Survey Fourth Quarter pp. 2-10.

Hybrid-Fiber Coax; Hung Nguyen and Felix Yao; Apr. 22, 1996; pp. 1-11.

Cable Data Modem Performance Evaluation, A Primer for Non-Technical Readers; Cable Television Laboratories, Inc.; Nov. 15, 1996; pp. 1-8.

Data-Over Cable Service Interface Specifications: Cable Modem to Customer Premise Equipment Interface Specification; SP-CMCI-12-980317; 1988; Cable Television Laboratories, Inc.; pp. 1-40.

Cable Device Management Information Base for DOCSIS Complaint Cable Modems and Cable Modem Termination Systems; Michael St. Johns; Mar. 30, 1999; pp. 1-54.

Data-Over Cable Service Interface Specifications; Cable Modem Telephony Return Interface Specification; SP-CMTRI-101-970804; 1997; Cable Television Laboratories, Inc.; pp. 1-74.

Radio Frequency (RF) Interface Management Information Base for MCNS Complaint RF Interfaces Draft-ietf-Jipcdn-rf-interface-mib-04.txt; May 22, 1998; Guenter Roeck (editor); pp. 1-55.

Cable Device Management Information Base for MCNS Complaint Cable Modems and Cable Modem Termination Systems draft-ietf-ipcdn-cable-device-mib-04.txt; May 22, 1998; Guenter Roeck (editor); pp. 1-32.

Baseline Privacy Interface Management Information Base for MCNS Complaint Cable Modems and Cable Modem Termination Systems; R. Woundy; Jan. 17, 1999; pp. 1-35.

Logical IP Subnetworks over IEE 802.14 Services; Mark Laubach; Mar. 13, 1998; pp. 1-13.

MAC Protocols for Multimedia Data over HFC Architecture; Dolors Sala Batlle; Nov. 27, 1995; pp. 1-28.

Radio Frequency (RF) Interfaces Management Information Base for MCNS/DOCSIS Compliant RF Interfaces; Mike St. Johns, (Editor); Feb. 17, 1999; pp. 1-67.

Telephony-Return Interface (TRI) Management Information Base for DOCSIS complaint Telephony-Return Cable Modems and Cable Modem Termination systems; S. Adiraju, J. Fijolek; Apr. 2, 1999; pp. 1-27.

Data Over Cable System Quality of Service Management Information Base (DOCSIS-QOS MIB); M. Patrick, J. Harvey, Motorola ING; Jun. 25, 1999, pp. 1-43.

Docsis 1.1 IGMP MIB; H. Abramson, Motorola; Jun. 1999; pp. 1-13.

"The DSL Sourcebook", Paradyne Corporation, Copyright 2000, DSL-Book-3.0-0900, 98 pages.

Olshansky, "A Full Service Network for the Copper Plant", Telephony, 1985, pp. 52-60.

Instant Network Rules on Phone Lines, Electronic Design, 1987.

O. Agazzi, et al., "Large Scale Integration of Hybrid-Method Digital Subscriber Loops," IEEE Transactions on Communications, vol. COM-30, No. 9, Sep. 1982, pp. 2095-2108.

S.V. Ahamed, et al., "A tutorial on Two-Wire Digital Transmission in the Loop Plant", IEEE Transactions on Communications, vol. COM-29, No. 11, Nov. 1991, pp. 1554-1564.

J. Alves, "Data Over Voice—A Low Cost LAN Alternative", Communications Show and Conference, MECOM 87, January, pp. 13-15.

S.B. Andrews, "The Generic Digital Channel Concept", IEEE International Conference on Communications, Jun. 23-26, 1985, Chicago, IL, pp. 7.1.1-7.1.3.

G.W. Beene, "Design Considerations for a CO-Powered Distributed-Drop PCM Station Carrier", IEEE Transactions on Communications, vol. COM-30, No. 9, Sep. 1982, pp. 2022-2028.

A. Bienz, "1+1=1—Order Das Telefonnetz Als Datennetz", Sysdata, vol. 16, Aug. 28, 1985, pp. 41-42.

A. Brosio, et al., "A Comparison of Digital Subscriber Line Transmission Systems Employing Different Line Codes", IEEE Transactions on Communications, vol. COM-29, No. 11, Nov. 1981, pp. 1581-1588.

T.P. Byrne, et al., "Positioning the Subscriber Loop Network for Digital Services", IEEE Transactions on Communications, vol. COM-30, No. 9, Sep. 1982, pp. 2006-2011.

R.G. Cornell, et al., "Progress Towards Digital Subscriber Line Services and Signaling", IEEE Transactions on Communications, vol. COM-29, No. 11, Nov. 1981, pp. 1589-1594.

S. Davis, "Integrating Voice and Data: A Marriage of Convenience", Today's Office, vol. 24, No. 9, Feb. 1990, pp. 28-30.

M. Devault, et al., "Resaux Domestiques et Terminaux Audiovisuels Numeriques", L'Echo Des Recherches, No. 126, 1986, pp. 37-46.

H. Fuchs, et al., "Providing Full Duplex Transmission Over Two-Wire Subscriber Loops", Telephony, vol. 208, No. 11, Mar. 18, 1985, pp. 76, 77, 78 and 84.

Twisted Pair Physical Layer and Medium Specification; Revision: IS-60 Aug. 18, 1995 (49 pages).

Introduction to the CEBus Standard; Revision Feb. 5, 1995 Draft Copy (19 pages).

Compaq to Ride the CEBus; by Mark Hachman, EBN Jan. 22, 1996 (1 page).

CEBus Router Testing; IEEE Transactions on Consumer Electronics Nov. 1991, vol. 37 No. 4 (8 pages).

Broadband Network Technology—An Overview for the Data and Telecommunications Industries; by Edward Cooper, Copyright 1984, p. 51-52 (4 pages).

Technical Report TR-001 ADSL Forum System Reference Model; May 1996 (6 pages).

DSLPipe User's Guide; by Ascend Communications, Jun. 3, 1997 (245 pages).

DSLPipe Reference Guide; by Ascend Communications, Jun. 2, 1997 (162 pages).

Ascend DSLPipe-S Features; Posted May 12, 1997 (2 pages).

Broadband Digital Subscriber Line—A Full Service Network for the Copper Plant; Telephony / Jun. 12, 1995, vol. 228 No. 24 (8 pages).

Commtek Intros Video over UTP; Communications Week, Feb. 10, 1992 (3 pages).

Aurelio Amodei, et al., "Increasing the Throughput of the HomePNA MAC Protocol, IEEE, Proceedings of the 29th Annual IEEE International Conference on Local Computer Networks (LCN '04), 8 Pages", Nov. 1, 2004, 8 pages(s), None. cited by other.

"Home Phoneline Networking Alliance", Interface Specification for HomePNA 2.0 10M8 Technology Link Layer Protocol, (Dec. 1, 1999), pp. 1-39.
"Home Phoneline Networking Alliance", Interface Specification for HomePNA 2.0 10M8 Technology, (Dec. 1, 1999), pp. 1-77.
Paola Bisaglia, et al., Receiver Architectures for HomePNA 2.0, Hewlett Packard Laboratories, Bristol, U.K., Oct. 7, 2001.
Loh, L.; Ozturk, Y.; Quality of Supprot and Priority Management in HomePNA 2.0 Link Layer.quadrature..quadrature.Computers and Communication; Jun. 30-Jul. 3, 2003. (ISCC 2003). Proceedings. Eighth IEEE International Symposium; pp. 861-866 vol. 2.
Phoneline / HPNA / HomePNA Networks, http://www.homenethelp.com/web/howto/HomeNet-HPNA.asp (visited Jul. 29, 2003) (3 pages).
Anonymous, HomePNA Specification 1.0 Field Tests Status, Mar. 1999, Home Phoneline Networking Alliance, Inc, pp. 1-6.
21145 Phoneline/Ethernet LAN Controller, Intel Corporation .COPYRGT. 1999, http://developer.intel.com/design/network/21145.htm.
Simple, High-Speed Ethernet Technology For The Home, White Paper, Home Phoneline Networking Alliance, Jun. 1998, pp. 1-11.
Information on Home PhoneLine Networking Alliance (Home PNA), dated Jun. 1998 and before.
M.G. Vry, et al., The Design of A 1+1 System for Digital Signal Transmission to the Subscriber, NTG-Bachberichte, vol. 73, 1980, pp. 36-40.
Joseph A. Webb, A New Concept in Data-Above-Voice (DAV), PTC 86: Evolutions of the Digital Pacific. Telecommunications-Asia, Americas, Pacific: PTC '86 Proceedings, Jan. 12-15, 1986, Honolulu, Hawaii, pp. 260-265.
Kazuyuki Yamamoto and Nobuhlsa Ayugase, A Home Terminal System Using the Home Area Information Network, IEEE Transactions on Consumer Electronics, vol. CE-30, Nov. 1984, pp. 608-616.
Centrex LAN Can Provide Advanced Network Capabilities over the Existing Telephone Wires, Communications News, vol. 25, No. 6, Jun. 1988, p. 27.
Data Over Voice Is Solution for Corporate Network, Telephone Engineer and Management, vol. 91, No. 9, May 1, 1987, pp. 67-69.
Data Carrier System Allows Simultaneous Voice/data Transmission for PABX Telephone Systems, Computer Design, vol. 21, No. 5, May 1982, pp. 68, 70.
Computerized Telephone System Integrates Vocie and Data Switching, Computer Design, vol. 20, No. 4, Apr. 1981, 6 pages.
AT&T's Systemax Premises Distribution System Solves Networking Problems, Fiber Optics Magazine, vol. No. 4, Jul.-Aug. 1990, pp. 14-16.
M.M. Anderson, Video Services on Copper, COnference: ICC 91, International Conference on COmmunications Conference Record, Jun. 2-26, 1991, Denver, CO, pp. 302-306.
M. Bastian, Voice—Data Integration: An Architecture Perspective, IEEE COmmunication Magazine, vol. 24, No. 7, Jul. 1986, pp. 8-12.
M. Boubekker, Bandwidth Reduction for the Transmission of Sign Language Over Telephone Lines, Proceedings of the SPIE—The International Society for Optical Engineering, vol. 1001, Pt 1, 1998, pp. 223-230.
S. Bramblett, Connect Terminals to Your CPU Over PBX Telephone Lines, EDN, vol. 31, No. 5, Mar. 6, 1986, pp. 239-243, 245, 246, 248.
G. D. Carse, New and Future Technologies in the Local Telephone Network: The Victoria System, Conference IEEE International COnference on Communications '86 ICC '86: Integrating the World Through Communications Conference Record, Jun. 22-25, 1986, Toronto, Ontario, Canada, pp. 410-412.
C. Dougligeris, et al., Communcuations and Control for a Home Automation System, Conference: IEEE Proceedings of the Southeastcon '91, bol. 1, pp. 171-175.
D.G.J. Fanshawe, Architures for Home Systems, Conference: IEEE Colloquium on Home System—Information, Entertainment and Control, Oct. 1, 1990, London, United Kingdom, pp. 3/1-3/3.
N.C. Hightower, Integrated Voice, Data and Video in the Local Loop, IEEE 1986, pp. 915-919.
M. Inoue, et al., A Home Automation System, IEEE Transaction on COnsumer Electronic, vol. CE-31, No. 3, Aug. 1985, pp. 516-527.

J. W. Lechleider, Study of the Feasbility and Advisability of Digital Subscriber Lines Operating at Rates Substantially in Excess of the Basic Access Rate, T1E1.4 Technical Subcommittee (T1E1.4/89-070), 1 page.
S. Motoyama, et al., A Subscriber Loop Multiplexing System for Integrated Service Digital Newtorks, Conference: NTC '81 IEEE 1981 National Telecommunications COnference, Innovative Telecommunications—Key to the Future, Nos. 29—Dec. 3, 1981, New Orleans, Louisiana, pp. D5. 1.1-D5.1.5.
G. Neumann, Flexible and Cost-Minimising System Concept (Ericsson Digital PABX MD 110), Net Nechrichten Elektronik—Telematik, Special Issue, Mar. 1988, p. 11, 12, 14, 15.
Grayson Evans, The CEBUs Standard User's Guide, 1st edition, May 1996, 317 pages.
Mark Hachman, Compaq to Ride the CEBus, EBN, Jan. 22, 1996, 1 page.
Home Automation Buses: Protocols Really Hit Home, EDN, Apr. 13, 1995, 9 pages.
Brian E. Markwalter, et al; CEBus Router Testing, IEEE Transactions on Consumer Electronics, Nov. 1991, vol. 37, No. 4, 8 pages.
Draft IS-60.04 Node Communications Protocol Part 6: Application Layer Specification, Rev. Apr. 18, 1996, 129 pages.
Arvind J. Karia et al, A Digital Subscriber Carrier System for the Envolving Subscriber Loop Network, vol. com 36, No. 9 Sep. 1992.
T. Masuda et al, 2-Wire Video Intercom System with Telephone vol. 37. No. 6 Dec. 1991.
Haruo Ogiware et al., Design Phiosophy and Hardware Implementation for Digital Subscriber Loops, IEEE Transactions on Communications, vol. COM-30, No. 9, Sep. 1982, pp. 2057-2064.
M. Ise, et al., "Sharp Home Bus System," Sharp Technical Journal, No. 29, 1984, pp. 49-55.
S. Tsuruta, "Home Media Bus: An Integrated Network for Home Information Systems," 1984 IEEE International Conference on Consumer Electronics. Digest of Technical Papers, Jun. 6-8, 1984, Rosemont, Illinois, 2 pp.
C. Dougligeris, et al., "Communications and Control for a Home Automation System," Conference: IEEE Proceedings of the Southeastcon '91, vol. 1, pp. 171-175.
D.G.J. Fanshawe, "Architures for Home Systems," Conference: IEEE Colloquium on Home Systems—Information, Entertainment and Control, Oct. 1, 1990, London, United Kingdom, pp. 3/1-3/3.
M. Inoue, et al., "A Home Automation System," IEEE Transactions on Consumer Electronics, vol. CE-31, No. 3, Aug. 1985, pp. 516-527.
"CEBus: US Households are Being Networked," Funkschau, No. 9, Apr. 1989, pp. 45-47.
Coaxial Feeder Cables [Engineering Notes], PYE Telecommunications Limited Publication Ref No. TSP507/1, Jun. 1975, Cambridge, England, 15 pages.
Freeman, "Telecommunication Transmission Handbook," 2.sup.nd Ed., Cover, pp. xi-xxvii, Chapter 3 (pp. 79-127), Chapter 5 (pp. 172-252), Chapter 6 (pp. 253-288), 1981.
Hoe-Young Noh, "Home Automation," Korea Information Science Society Review, Apr. 1989, vol. 7 No. 2, pp. 40-44, Republic of Korea. (Translation Provided).
007364-007413 EIA-600.33 Coax Cable Physical Layer & Medium Specification; Revision: IS-60, Sep. 25, 1995 (50 pages).
012891-012893 Motorola Announces Key New Features to CyberSURFR Cable Modem System; Motorola, Mar. 17, 1997 (3 pages).
012894-012897 CyberSURFR Cable Modem Specifications; Motorola, Mon. Apr. 13, 1998 (4 pages).
'High-Speed Cable Modems', pp. 1-246 by Albert A. Azzam, 1997, ISBN: 0-07-006417-2 (276 pages).
'High-Speed Cable Modems', pp. 247-570 by Albert A. Azzam, 1997, ISBN: 0-07-006417-2 (321 pages).
Claim Chart presented in request for reexamination of U.S. Patent No. 6,480,510 request filed Jun. 10, 2009.
Claim Chart presented in request for reexamination of U.S. Patent No. 5,841,360 request filed May 26, 2009.
Office Action: Japanese Patent Application No. 2006-553760, dated Jan. 14, 2010.

J. Hofmann, Cable, Television, and the Consumer Electronic Bus, Symposium Record, 15th International TV Symposium, Jun. 11, 1987, Montreux, Switzerland, 9 pages.

Ascend DSLPipe-S Specifications; copyright 1997, (2 pages).

C. Valenti, "Study of the Feasibility and Advisability of Digital Subscriber Lines Operating at Rates Substantially in Excess of the Basic Access Rate", T1E1.R Technical Subcommittee (T1E1.4/91-115), pp. 2 and 4; Aug. 26, 1991.

TeleVideo Brochure, 2 pages, published before Jul. 3, 1995.

"TeleConcepts . . . Introduces the Just Plug It In Intercom System, "TeleConcepts Brochure, Newington, CT, 2 pages, published before Jul. 3, 1995.

"Video Transmission System—Send Video Over Ordinary Wire—No Coax Required", Javelin Brochure, 2 pages, published before Jul. 3, 1995.

Data-Over Cable Technical Reports: Operation Support System Framework for Data Over Cable Service; TR-DOCS-OSSIW08-961016; MCNS Holdings, LP; pp. 1-20, Oct. 16, 1996.

Data-Over Cable Service Interface Specifications: Operation Support System Interface Specification; SP-OSSI-102-990113; Cable Television Laboratories, Inc.; pp. 1-26, Oct. 16, 1996.

Data-Over Cable Service Interface Specifications: Operation Support System Interface Specification Radio Frequency Interface:; SP-OSSI-102-990113; Cable Television Laboratories, Inc.; pp. 1-29, Jan. 13, 1999.

Extended DQRAP (EXQRAP) A Cable TV Protocol Functioning as a Distributed Switch; Chien-Ting Wu & Graham Campbell; Illinois Institute of Technology (Comp. Science Dept.); pp. 1-7, Mar. 12, 1994.

A Review of Contention Resolution Algorithms for IEEE 802.14 Networks; Nada Glomie; Yves Saintillan, & David H. Su; National Institute of Standards and Technology, pp. 1-11, Jan. 1, 1999.

Cisco, "Internal DOCSIS Configurator File Generator for the Cisco Cable Modem Termination System", Cisco Cable Modem Termination System Feature Guide, Chapter 6, Oct. 14, 2002.

A Review of Contention Resolution Algorithms for IEEE 802.14 Networks; Nada Glomie; Yves Saintillan, & David H. Su; National Institute of Standards and Technology, pp. 1-12, Jan. 1, 1999.

An Access Protocol to Support Multimedia Traffic Over Hybrid Fiber/Coax Systems, John O. Limb, Dolors Sala, pp. 1-6, Jun. 20, 1995.

Scheduling Disciplines for HEC Systems: What can we learn from ATM scheduling: Dolors Sala, Hohn O. Limb: GA Tech; pp.1-6, May 23, 1996.

A Protocol for Efficient Transfer of Data over Fiber/Cable Systems; Dolors Sala, John O. Limb; GA Tech; pp. 1-8, Jan. 1, 1997.

* cited by examiner

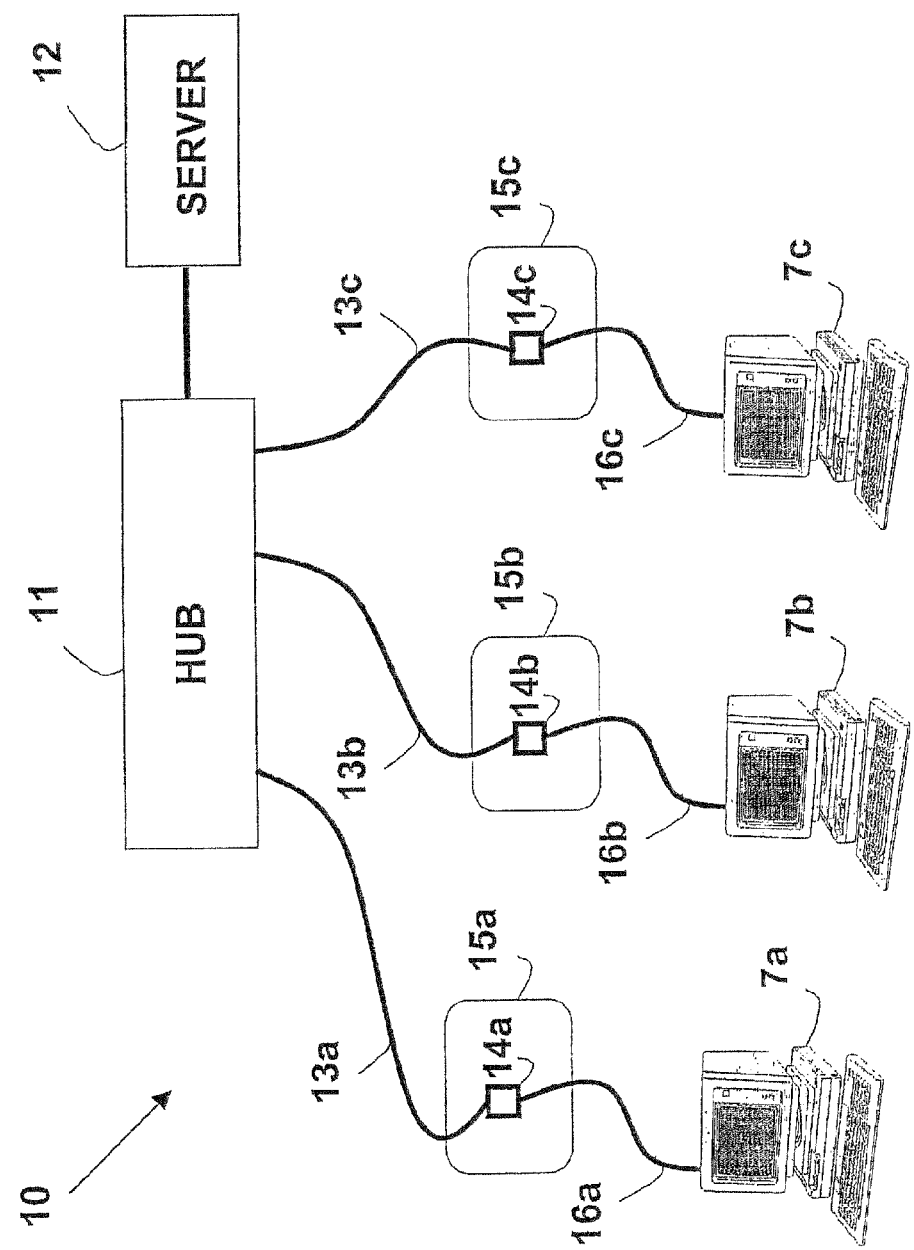
Fig. 1 (Prior-Art)

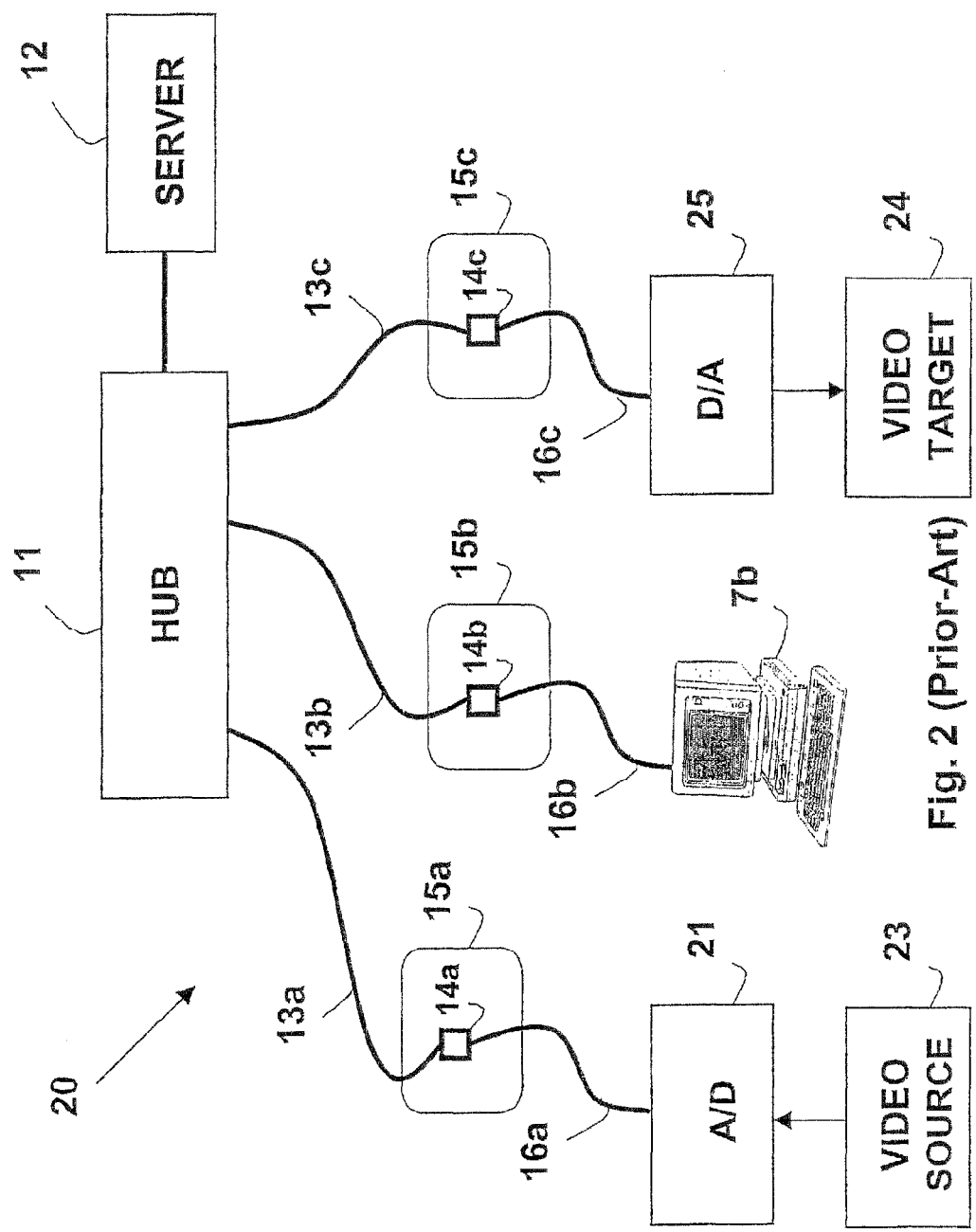
Fig. 2 (Prior-Art)

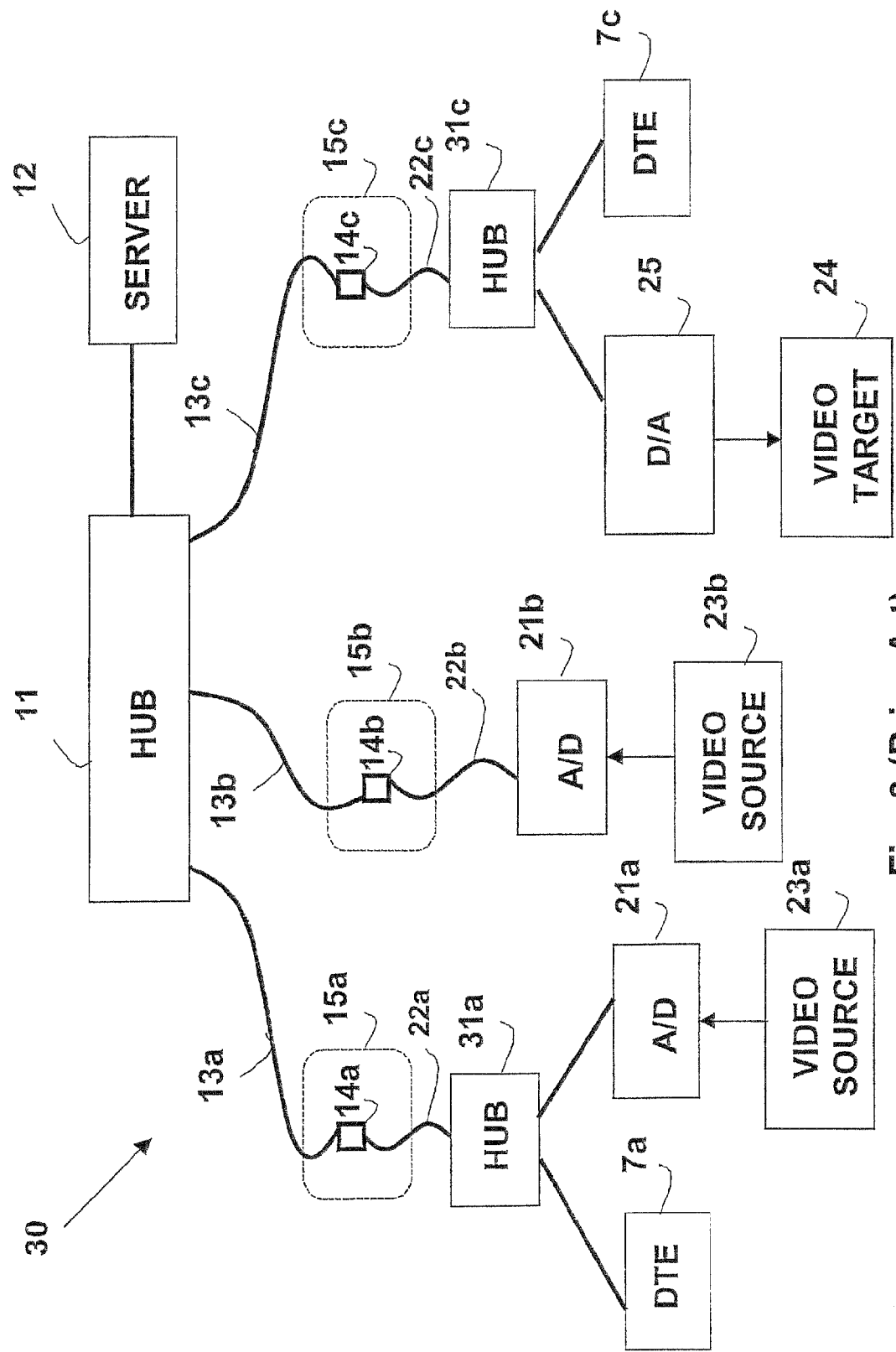
Fig. 3 (Prior-Art)

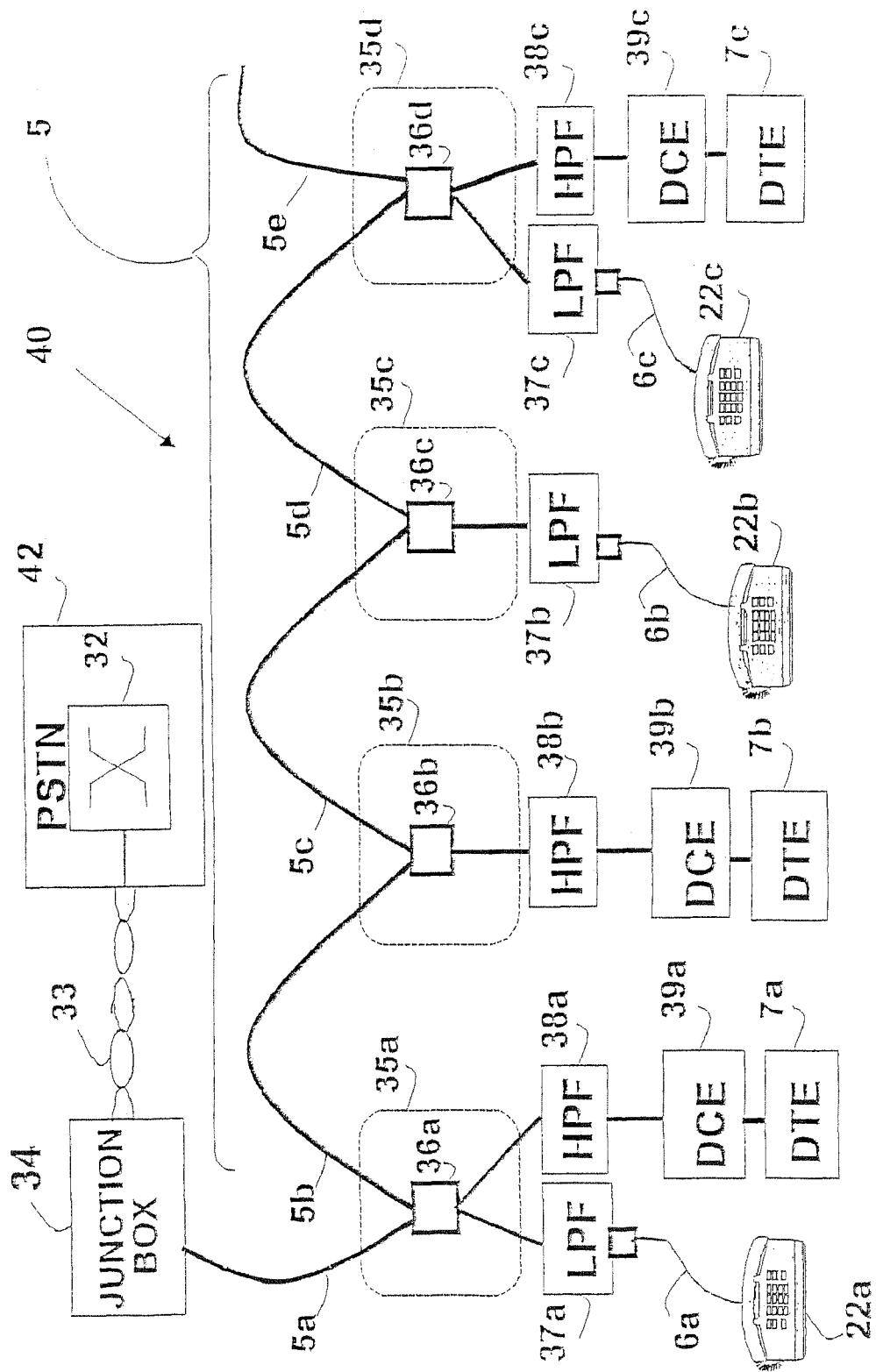
Fig. 4 (Prior-Art)

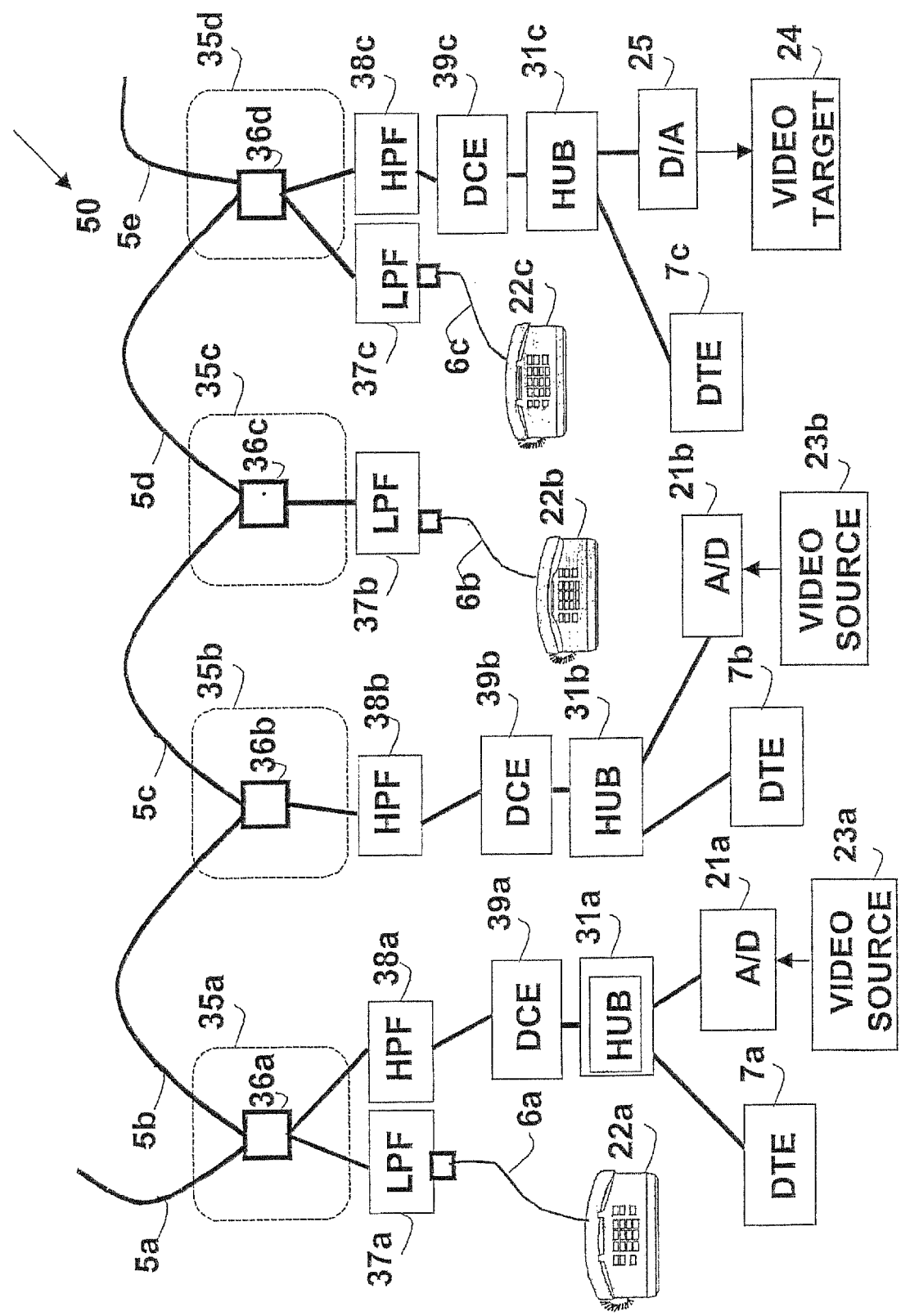
Fig. 5 (Prior-Art)

OUTLET WITH ANALOG SIGNAL ADAPTER, A METHOD FOR USE THEREOF AND A NETWORK USING SAID OUTLET

FIELD OF THE INVENTION

The present invention relates to the field of conveying analog video, and, more specifically, to the transport of analog video signals within a Local Area Network (LAN) over wiring simultaneously used for analog telephony.

BACKGROUND OF THE INVENTION

Outlets

The term "outlet" herein denotes an electro-mechanical device, which enables connection to wiring installed within a building. Outlets are permanently connected to the wiring, and allow easy connection of external units as required to such wiring, commonly by means of an integrated, faceplate built-in connector. The outlet is normally mechanically attached to, or mounted in, the wall. Non-limiting examples of common outlets include: telephone outlets for connecting telephone sets; CATV outlets for connecting television sets, VCR's, and the like; and electrical outlets for connecting power to electrical appliances.

LAN Environment

FIG. 1 shows a typical Local Area Network 10. Such a network, commonly using 10BaseT or 100BaseTX Ethernet IEEE802.3 interfaces and topology uses a hub 11 as a concentrating device, into which all devices are connected. Devices are connected to hub 11 by data connectors 14a, 14b, and 14c, which are housed within respective network outlets 15a, 15b, and 15c via respective cables 13a, 13b, and 13c. Data connectors 14a, 14b, and 14c may be, for example, type RJ-45; and cables 13a, 13b, and 13c may be, for example, Category 5 cabling. The data portion of network 10 uses data units (e.g. computers) 7a, 7b, and 7c, which connect to network connectors 14a, 14b, and 14c via respective cables 16a, 16b, and 16c. A server 12 may also be connected to hub 11, and can perform the external connection functionality, as well as other server functions as applied in the art.

Although FIG. 1 refers to the hub 11 as a concentrating device, it is understood that any type of device having multiple network interfaces and supporting a suitable connectivity can be used, non-limiting examples of which include a shared hub, switch (switched hub), router, and gateway. Hence, the term "hub" used herein denotes any such device. Furthermore, the network 10 can be any packet based network, either in-building or distributed, such as LAN or the Internet.

While the network 10 is specifically designed to carry digital signals, still many devices in the home or office environment are using an analog type of interface. Specifically, video associated equipment such as VCR, video monitors, video cameras uses standard analog video interface for networking. The term "video source" used herein denotes any device having analog video output, non-limiting examples being VCR (while playing), analog video camera, TV receiver. The term "video target" used herein denotes any device having analog video inputs non-limiting examples being VCR (while recording), analog video monitor.

In order to employ video transportation from a video source to a video target via the digital data network, additional adapters converting analog to digital and vice versa are required. This will become clearer from FIG. 2 showing a digital data network 20, used for carrying analog video signal. An Analog-to-Digital (A/D) 21 is used to connect a video source 23 to the network connector 14a via respective the cable 16a, and converts the analog video signal into digital data. Similarly, a digital-to-analog (D/A) 25 is used in the receiving side, converting the network data signal into analog video, fed to a video target 24. Such A/D 21 and D/A 25 serve as adapters for converting from analog to digital and vice versa and are expensive, require connection to a power outlet (or other power supply) and are not yet common in the marketplace.

Although the digital data network 20 facilitates the employment of common, low-cost standard video units, the adapters 21 and 25 are necessary, malting installation and maintenance complex, and requiring additional equipment, connections, and cables. Furthermore, such adapters require a power connection, further complicating installation, use, and maintenance.

Furthermore, although FIG. 2 shows a network in which the outlets 15a and 15c are used solely for the connection of video units, LANs today are intended for use principally in data communication, to connect Data Terminal Equipment (DTE) devices (such as desktop personal computers, printers). In some cases, the number of outlets 15 (or connectors 14) may not suffice for both telephony and data applications. For example, this may be the case in an office where each work area has a single network connection via a single outlet 15 having single connector 14. In this case, a hub (or other multi-port unit) must be connected to expand to multiple network connections. FIG. 3 shows such a configuration in a prior-art network 30. In order to allow both adapter 21a and DTE 7a to share a single network outlet 15a via the connector 14a, a hub 31a is added. Similarly, a hub 31c is added, facilitating the connection of both adapter 21c and DTE 7c to a single network outlet 15c via the connector 14c. Thus, in such a configuration, additional hubs 31a and 31c must be added, introducing additional complexity in installation and maintenance.

Analog Telephone Network

Analog telephony, popularly known as "Plain Old Telephone Service" ("POTS") has been in existence for over 100 years, and is well-designed and well-engineered for the transmission and switching of voice signals in the 3-4 KHz portion (or "band") of the audio spectrum. The familiar POTS network supports real-time, low-latency, high-reliability, moderate-fidelity voice telephony, and is capable of establishing a session between two end-points, each using all analog telephone set.

The terms "data unit", "computer" and "personal computer" ("PC") as used herein include workstations and other data terminal equipment (DTE) with interfaces for connection to a local area network. The term "telephone set" or "telephone device" as used herein includes any device which can connect to a Public Switch Telephone Network ("PSTN") using analog telephone signals, non-limiting examples of which are fax machines, automatic telephone answering machines, and dial-up modems.

Home Networking

In-home telephone service usually employs two or four wires, to which telephone sets are connected via telephone outlets.

FIG. 4 shows the wiring configuration of a prior-art telephone system including a network 40 for a residence or other building, wired with a telephone line 5. The telephone line 5 comprises a single wire pair which connects to a junction-box 34, which in turn connects to a Public Switched Telephone Network (PSTN) 42 via a cable 33, terminating in a public switch 32, which establishes and enables telephony from one telephone to another. The term "analog telephony" herein denotes traditional analog low-frequency audio voice signals typically under 3 KHz, sometimes referred to as "POTS" ("Plain Old Telephone Service"), whereas the term "telephony" in general denotes any kind of telephone service, including digital service such as Integrated Services Digital Network (ISDN). The term "high-frequency" herein denotes any frequency substantially above such analog telephony audio frequencies, such as that used for data. ISDN typically uses frequencies not exceeding 100 KHz (typically the energy is concentrated around 40 KHz). The term "telephone line" herein denotes electrically-conducting lines which are intended primarily for the carrying and distribution of analog telephony, and includes, but is not limited to, such electrically-conducting lines which may be pre-existing within a building and which may currently provide analog telephony service. The junction box 34 is used to separate the in-home circuitry from the PSTN and is used as a test facility for troubleshooting as well as for new wiring in the home. A plurality of telephones may connect to telephone lines 5 via a plurality of telephone outlets 35a, 35b, 35c, and 35d. Each outlet has a connector (often referred to as a "jack"), denoted in FIG. 4 as 36a, 36b, 36c, and 36d, respectively. In North America, RJ-11 is commonly used for a jack. Each outlet may be connected to a telephone unit via a "plug" connector that inserts into the jack.

Network 40 is normally configured into a serial or "daisychained" topology, wherein the wiring is connected from one outlet to the next in a linear manner, but other topologies such as star, tree, or any arbitrary topology may also be used. Regardless of the topology, however, the telephone wiring system within a residence always uses wired media: two or four copper wires along with one or more outlets which provide direct access to these wires for connecting to telephone sets.

It is often desirable to simultaneously use existing telephone wiring simultaneously for both telephony and data networking. In this way, establishing a new local area network in a home or other building is simplified, because there is no need to install additional wiring. U.S. Pat. No. 4,766,402 to Crane (hereinafter referred to as "Crane") teaches a Local Area Network over standard two-wire telephone lines, but does not simultaneously support telephony.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described, for example, in U.S. Pat. No. 4,785,448 to Reichert et al. (hereinafter referred to as "Reichert").

This technique is exploited in U.S. Pat. No. 5,896,443 to Dichter (hereinafter referred to as "Dichter"). Dichter suggests a method and apparatus for applying a frequency domain/division multiplexing (FDM) technique for residential telephone wiring, enabling the simultaneous carrying of telephony and data communication signals. The available bandwidth over the wiring is split into a low-frequency band capable of carrying an analog telephony signal, and a high-frequency band capable of carrying data communication signals. In such a mechanism, telephony is not affected, while a data communication capability is provided over existing telephone wiring within a home. FDM is also widely used are xDSL systems, primarily Asymmetric Digital Subscriber Loop (ADSL) systems.

In addition to illustrating a residential telephone system, FIG. 4 also shows the arrangement of a Dichter network. Network 40 both serves analog telephones and provides a local area network of data units. Data Terminal Equipment (DTE) units 7a, 7b, and 7c are connected to the local area network via respective Data Communication Equipment (DCE) units 39a, 39b, and 39c. Examples of Data Communication Equipment include, but are not limited to, modems, line drivers, line receivers, and transceivers (the term "transceiver" herein denotes a combined transmitter and receiver), which enables communication over telephone line 5. DCE units 39a, 39b, and 39c are connected to respective high pass filters (HPF) 38a, 38b, and 38c, which allow access to the high-frequency band carried by telephone line 5. In order to avoid interference to the data network caused by the telephones, low pass filters (LPFs) 37a, 37b, and 37c are added to isolate the POTS carrying band, so that telephones 22a, 22b, and 22c connect to telephone line 5 for providing PSTN. Furthermore, a low pass filter (not shown in the figure) may also be connected to Junction Box 34 in order to filter noise induced from or to PSTN wiring 33.

FIG. 5 shows a telephone line-based LAS 50 wherein the data network is used for carrying both analog video and regular DTE network data. Hubs 31a, 31b, and 31c allow connecting respective DTE units 7a, 7b, and 7c as well as respective video adapters 21a, 21b, and 25 to respective single network connections via DCE units 39a, 39b, and 39c. The adapters 21a, 21b, and 25 are connected to the video units 23a, 23b and 24 respectively. Analog telephones 22a, 22b, and 22c are also shown connected via respective low pass filters (LPFs) 37a, 37b, and 37c to the telephone outlets 35a, 35c, 35d. Thus, the analog telephones are connected directly to the analog telephone line 5.

FIG. 5 demonstrates the complexity of such a configuration. At least three types of external devices are required: DCE units 39a, 39b, and 39c; hubs 31a, 31b, and 31c; and adapters 21a, 21b, and 25. Each of these devices usually requires a separate power connection, which adds to the complexity of the connections. Thus, such a network is complex and difficult to install, operate, and maintain. In WO 01/71980 of the present inventor entitled "Telephone outlet and system for a local area networks over telephone lines" published Sep. 27, 2001, as well as other patent applications, it is suggested to integrate the DCE, HPF, and LPF components into outlets 35a, 35b, and 35c. Nevertheless, external hubs 31a, 31b, and 31c, as well as adapters 21a, 21b, and 25 still impose additional complexity in such a network.

There is thus a widely recognized need for, and it would be highly advantageous to have, a means for allowing the use of analog video units in LAN environment without requiring additional external devices and allowing easy installation, operation, and maintenance. This goal is met by the present invention.

SUMMARY OF THE INVENTION

The present invention makes it easy and convenient to convey analog video signals in a digital data network environment. The invention provides an outlet for a Local Area Network (LAN), with an integrated analog video adapter. The outlet has a standard analog video connector allowing an analog video unit to be directly connected to, and used with, a digital data network.

In a first embodiment, an outlet according to the present invention is used with an ordinary LAN environment, such as Ethernet 10BaseT (IEEE802.3). The outlet allows connecting analog video units to the LAN via the integrated analog video adapter, supports analog video over the LAN media, and cm also support a standard network data connection using an integrated multi-port unit (e.g. hub, switch, or router). For standard network data connections, the outlet also includes at least one data networking jack (e.g. RJ-45 if 10BaseT or 100BaseTX is used) connected to a port.

In another embodiment, the outlet enables a LAN to be based on in-building telephone wiring, in a home or Small Office/Home Office (SoHo) environment. A packet-based LAN is implemented, and outlets according to the present invention serve as telephone outlets, network outlets and analog video. This allows for direct and convenient connection of analog video units over the data network. In such an arrangement, the regular analog telephony service remains unaffected, because the low-frequency analog portion of the spectrum is isolated by the FDM technique. As noted above, the outlet may also support a network data connection, using an integrated multi-port unit (e.g. hub, switch or router), and in this case also includes a data network jack (e.g. RJ-45 if 10BaseT or 100BaseTX is used) connected to a port.

Outlets according to the present invention can be installed as part of an original network installation, as a retrofit to an existing network, or to set up a network over existing telephone wiring.

BRIEF DESCRIPTION OF THE DRAWINGS

The invention is herein described, by way of non-limiting example only, with reference to the accompanying drawings, wherein:

FIG. 1 shows a prior art local area network.

FIG. 2 shows a prior art local area network supporting analog video transportation, using external analog video adapters.

FIG. 3 shows a prior art local area network supporting both analog video transportation and data terminal equipment using external adapters and DTE connectivity.

FIG. 4 shows a prior art local area network over telephone lines.

FIG. 5 shows a prior art local area network over telephone lines supporting both analog video transportation and DTE connectivity.

DETAILED DESCRIPTION OF THE INVENTION

Figure 6B:
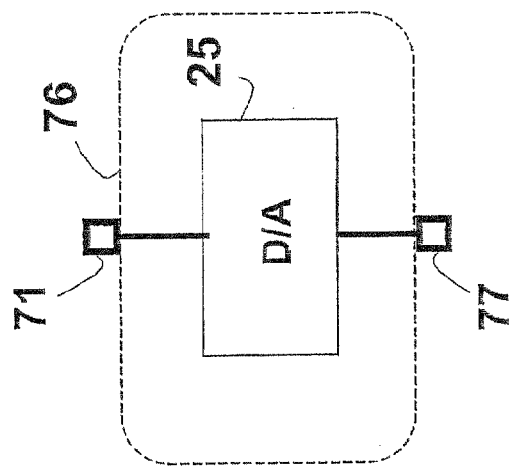
FIGS. 6*a*, 6*b*, 6*c* and 6*d* show schematically outlets according to different embodiments of the invention.
Figure 6D:
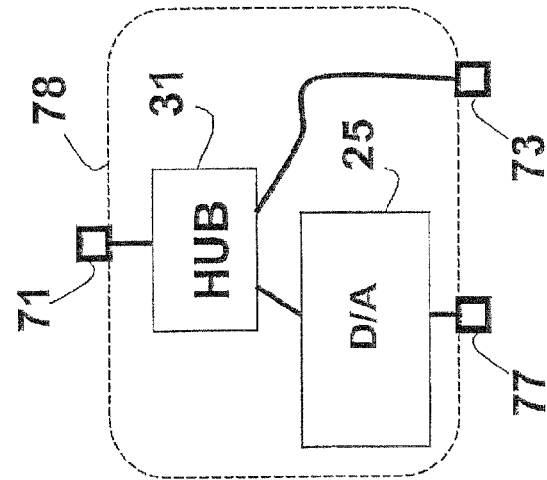

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Figure 6A:
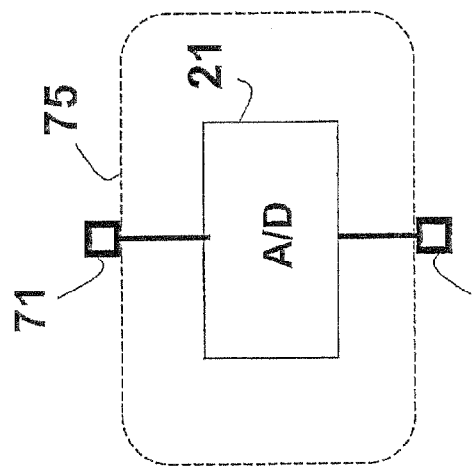

FIGS. 6*a* to 6*d* show schematically outlets 70, 75, 76 and 78 according to different embodiments of the invention. As shown in FIG. 6*a*, the outlet 75 includes a A/D 21. Outlet 75 connects to data network wiring via a connector 71. Connector 71 is preferably located at the rear of outlet 75, where outlet 75 mechanically mounts to an interior wall of a building. Outlet 75 connects to an analog video signal source via a jack 72. Jack 72 is preferably located at the front, or "panel" of outlet 75, which is visible when outlet 75 is mounted on an interior wall of a building. Jack 72 can be a BNC jack, or any other analog video connector commonly used for analog video. Outlet 75 allows connecting an analog video source (via jack 72) to the data network via connector 71, bridged by an adapter 21. Similarly, outlet 76 shown in FIG. 6*b* includes a D/A 25 and analog video connector 77, allowing the connection of analog video target via connector 77 to the outlet 76, wherein the analog signal is generated by the D/A 25, and fed via connector 71 from the digital data network. Both outlets 75 and 76 allow the connection of a single video unit (either source or target) to the network via the outlet.

Figure 6C:
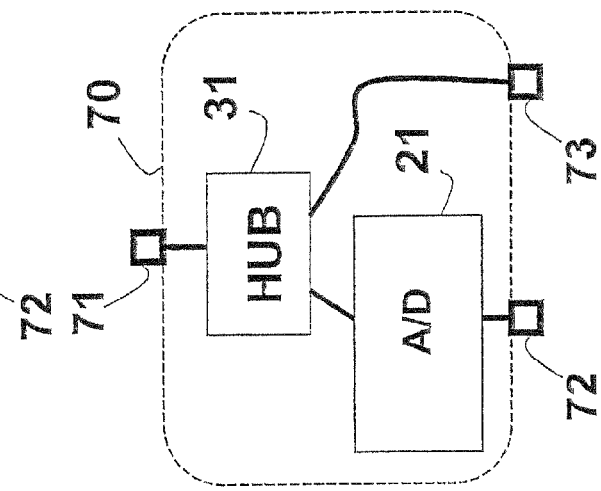

As shown in FIG. 6*c*, the outlet 70 also includes the A/D 21 (similar to outlet 75), but further includes a hub 31 and a data jack 73, which is connected directly to hub 31. Because of the hub 31, the outlet 70 allows both an analog video (via jack 72) and a data unit (via jack 73) to be connected to the data network via connector 71. Preferably, both jack 72 and jack 73 are located at the front, or "panel" of outlet 70. Similarly, outlet 78 shown in FIG. 6*d* allows for both an analog video (via jack 77) and a data unit (via jack 73) to be connected to the data network via connector 71.

Figure 7:
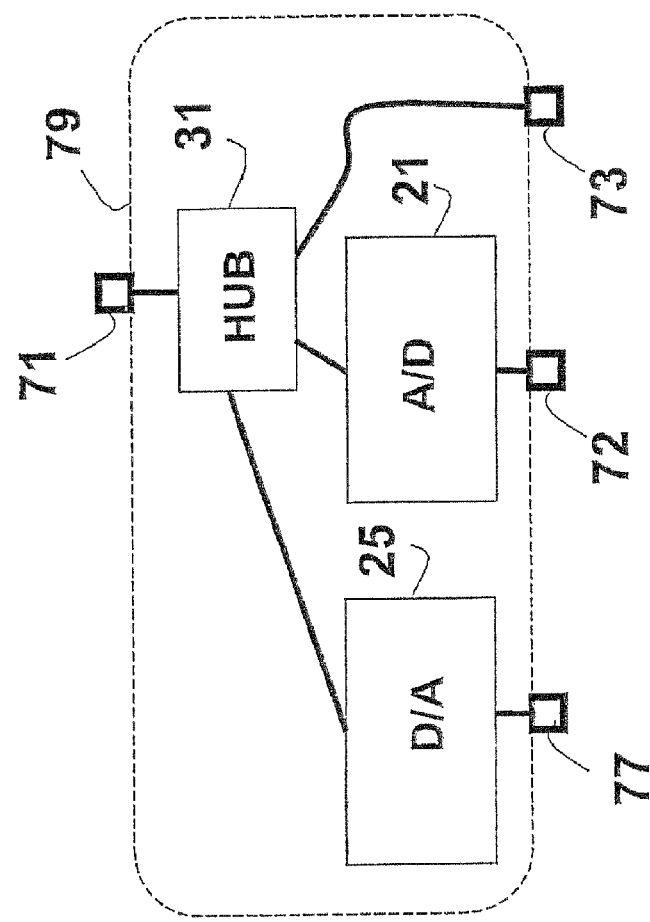
FIG. 7 shows schematically an outlet according to another embodiment of the invention.

FIG. 7 shows a particularly versatile outlet 79. This outlet allows for connection of an analog video target via connector 77, being fed from the network via D/A 25, a connection of analog video source via connector 72, being connected to the A/D 21 and data unit connection via connector 73. A four-port hub 31 is thus required, allowing the data to be shared among the D/A 25, A/D 21 and the data unit connected to connector 73.

Figure 8:
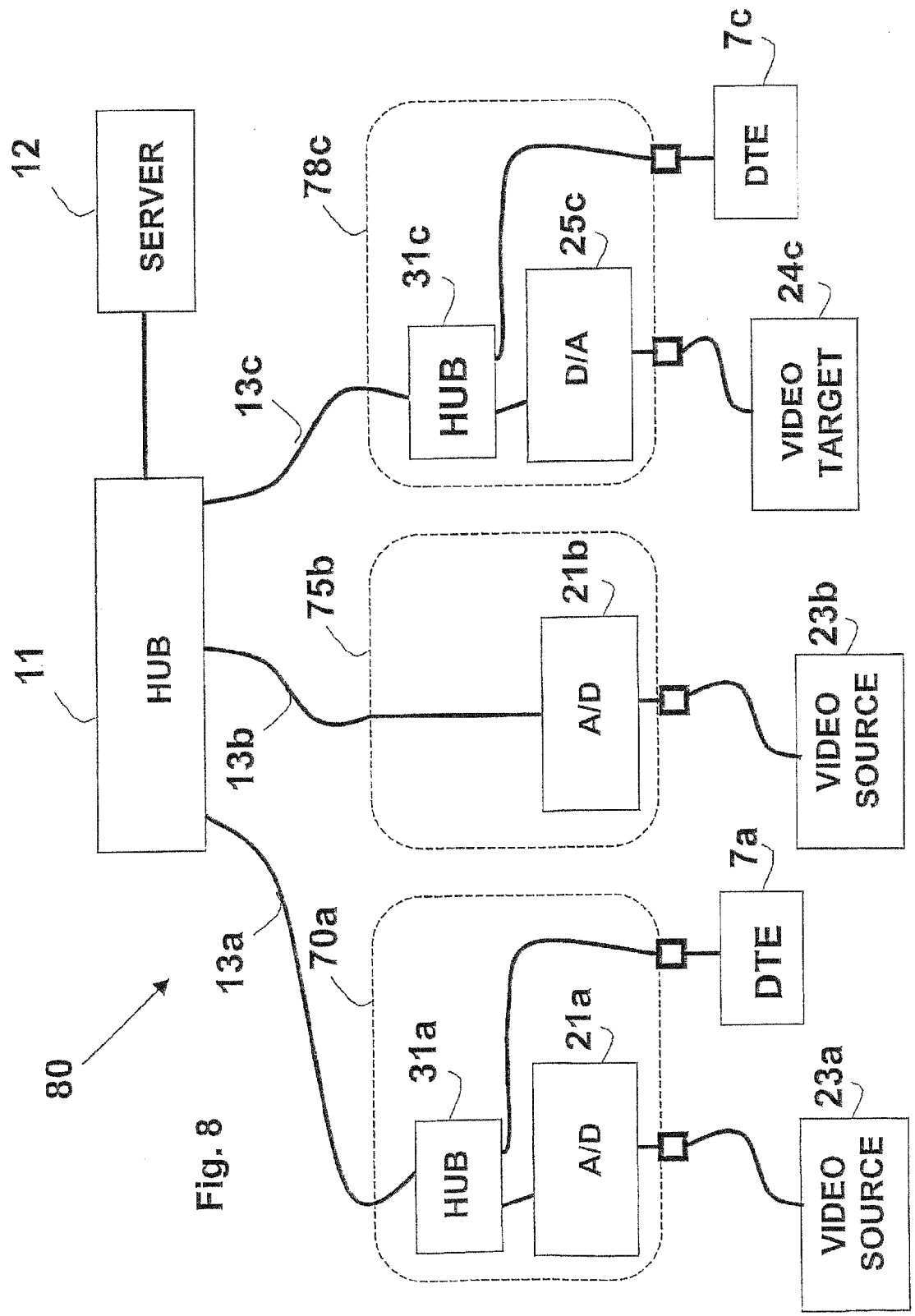
FIG. 8 shows a local area network supporting both analog video transportation using adapters and DTE connectivity, employing outlets according to the present invention.

FIG. 8 shows a Local Area Network (LAN) 80 according to the present invention. Basically, the infrastructure of network 80 is the same as that of prior art network 10 (FIG. 1), in which hub 11 is connected in a 'star' topology to various end units via network wiring 13*a*, 13*b*, and 13*c*, and outlets 15*a*, 15*b*, and 15*c*. However, according to the present invention, outlets 15*a*, 15*b*, and 15*c* of the prior art network 10 are replaced by outlets 70*a*, 75*b*, and 78*c*, respectively, each of which contains an adapter as previously described with reference to FIG. 6 of the drawings. For example, outlet 75*b* has a built-in A/D 21*b* and allows for connection of an analog video source 23*b*. Outlet 70*a* allows analog video source 23*a* and data unit 7*a* to be connected to the network. Similarly, outlet 78*c* allows analog video target 24*c* and data unit 7*c* to be connected to the network. Hubs 31*a* and 31*c* integrated within outlets 70*a* and 78*c*, respectively, allow for the connection of respective DTE units 7*a* and 7*c* to the network, in addition to respective analog video units 23*a* and 24*c*. Network 80 allows networking of both DTE units 7*a* and 7*c* and analog video units 23*a*, 23*b*, and 24*c*, and instances of such a network may consist solely of instances of outlet 75 (FIG. 6*a*), supporting only analog video sources 23 over the network. It may likewise consist solely of instances of outlet 70 (FIG. 6c) or of outlet 78 (FIG. 6d), both supporting analog video units as well as data networking, or a mixed configuration of any of outlets 79, 75, 76, 70 and 78, in any number and combination.

Powering any of the outlets mentioned above, can be implemented either locally by connecting a power supply to each outlet, or, preferably, via the network itself. In the latter case, commonly known as "Power over LAN", the power can be carried to the outlet from a central location either by an additional wire pair, using the well-known phantom configuration, or by the FDM (Frequency Division/Domain Multiplexing) method. The latter commonly employs DC feeding, which is frequency-isolated from the data carried in the higher part of the spectrum.

Figure 9:
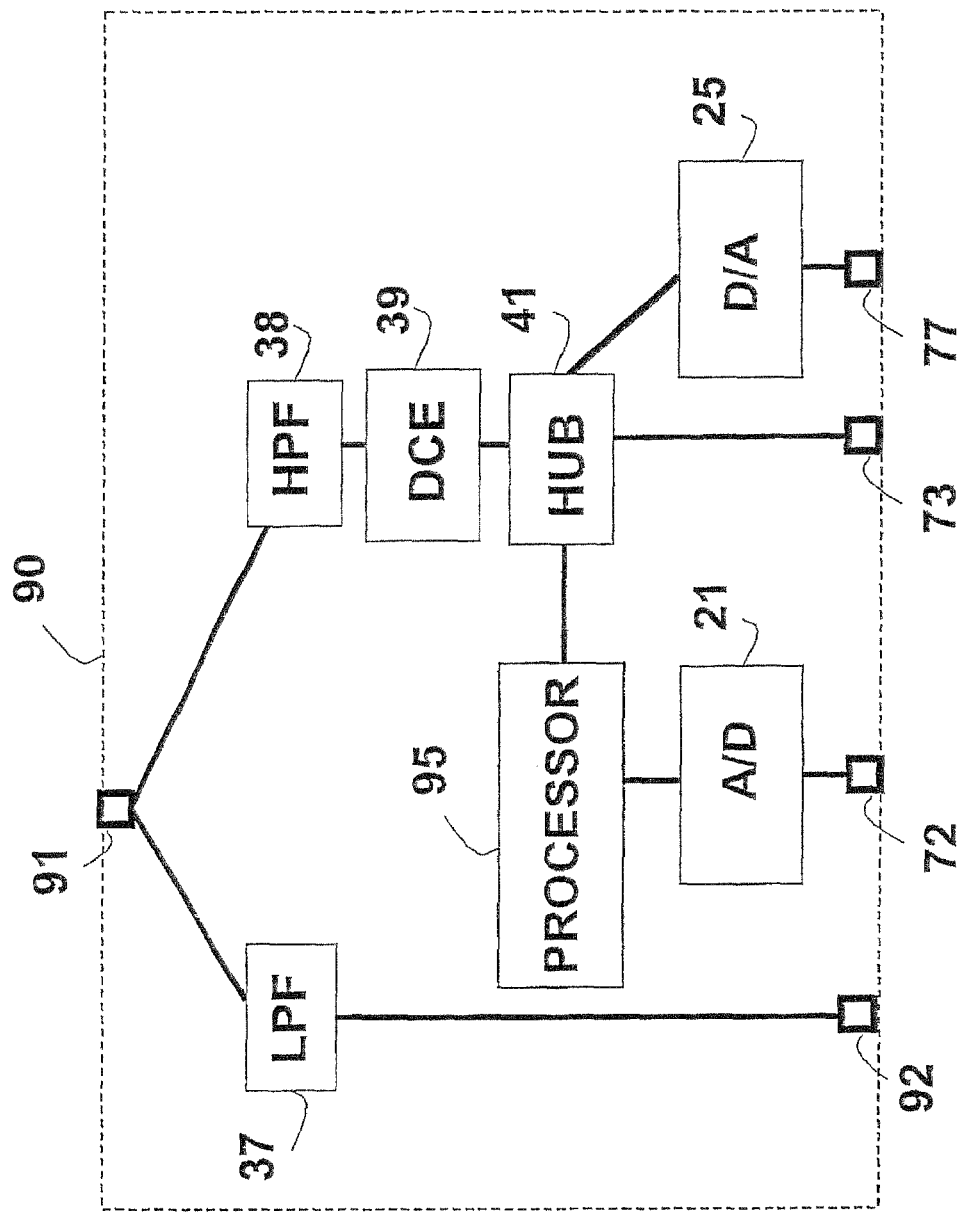
FIG. 9 illustrates schematically an outlet supporting analog telephony, DTE connectivity and analog video transportation according to the invention.

Network 80 offers the advantages of the carrying analog video, but requires the infrastructure of LAN wiring, which may not exist within a home. In another embodiment, the invention is used in a data network over in-building telephone lines, where the analog telephony signals are carried in the low-frequency portion of the spectrum, and the data communication signals are carried in the high-frequency portion. FIG. 9 shows an outlet 90 according the present invention, which is able to separate and combine signals in different portions of the spectrum. Outlet 90 connects to the telephone wiring via a connector 91, preferably located at the rear part of outlet 90, where outlet 90 mechanically mounts to an interior wall of the building. A Low Pass Filter (LPF) 37 in outlet 90 is used for isolating the analog telephony part of the spectrum, for connecting an analog telephone via a jack 92. Jack 92 is preferably a standard telephone jack, such as RJ-11 in North-America. Data communication signals are isolated by a High Pass Filter (HPF) 38, which connects to a Data Communications Equipment (DCE) unit 39, containing a modem for data communications over the telephone line media. An integrated hub 41 allows sharing data between analog video adapters 21 and 25, and a data jack 73, for connecting external devices to the network via DCE unit 39 with a standard data networking interface (such as a 10BaseT interface per IEEE802.3). The adapters 21 and 25 allow connection of an analog video units to the jacks 72 and 77 respectively, as previously described, thereby allowing analog video signals produced by an analog video units connected to the jacks 72 and 77 to be combined in digital form with data signals received by the data jack 73. Jack 92 is preferably a standard telephone jack, such as RJ-11 in North-America. Jack 72 and 77 are preferably standard analog video jacks such as BNC. Outlet 90 supports both standard analog telephony (via jack 92) as well as analog video via jacks 72 and 77.

Figure 10:
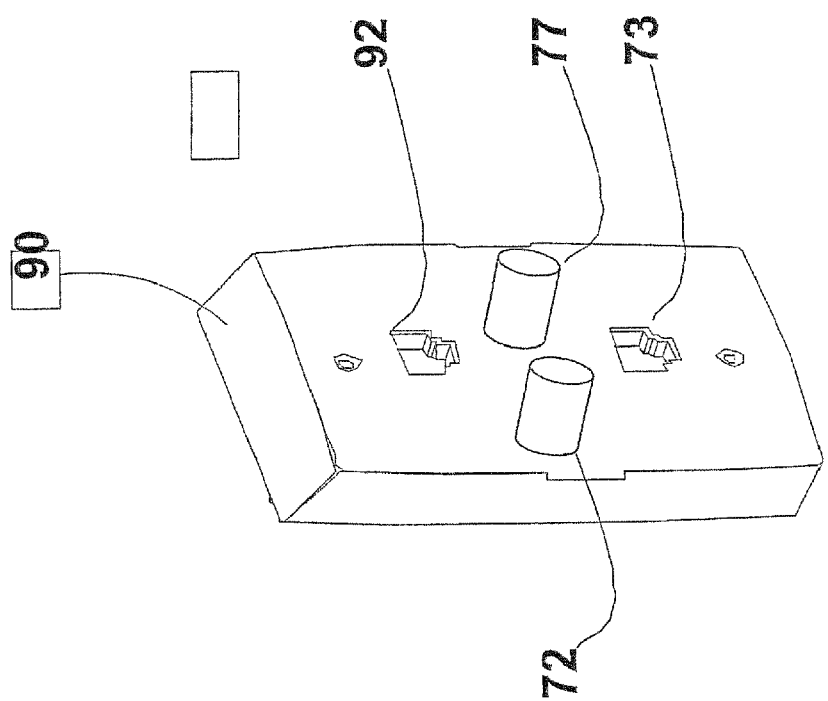
FIG. 10 illustrates pictorially an outlet according to the present invention.

Thus, outlet 90 supports four types of interface: Regular analog telephony (via jack 92), data communications (via jack 73), analog video source connection via jack 72 and analog video target connection via jack 77. A subset of such functionalities can also be provided. For example, an outlet solely supporting analog video target connection can be implemented, eliminating the need for LPF 37 and jack 92, and also eliminating hub 41 and jack 73 as well as A/D 21 and related jack 72. In such a case, D/A 25 directly connects to DCE unit 39. FIG. 10 demonstrates the outlet 90 pictorially. The outlet shape and structure fits into regular telephone outlet installation in North America, and the telephone jack 92 is of RF-11 type, the data connector 73 is of RJ-45 type, and analog video connectors 72 and 77 uses BNC connector type.

Figure 11:
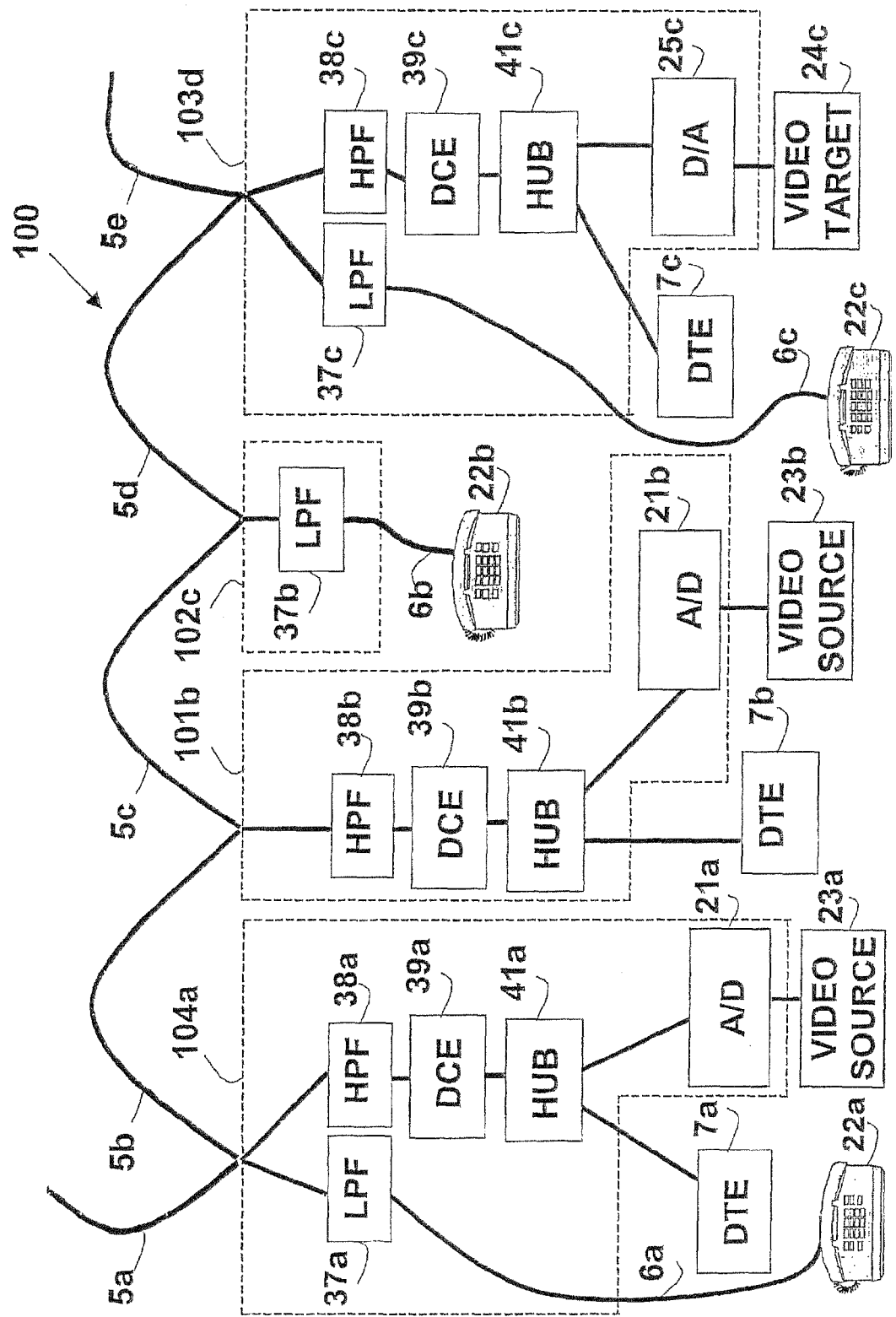
FIG. 11 illustrates a local area network over telephone lines supporting both analog video transportation using adapters and DTE connectivity, employing outlets according to the present invention.

FIG. 11 illustrates a network 100 that operates over telephone lines 5a, 5b, 5c, 5d, and 5e according to the present invention. Network 100 employs outlets 104a, 101b, 102c and 103d. Outlet 104a differs from outlet 90 by not having analog video target connection support, because no D/A 25 and associated jack are present. Outlet 101b differs from outlet 104a by having no PSTN connection support, because no LPF 37 and associated jack are present. Similarly, outlet 102c allows only for PSTN connection by employing LPF 37b and an analog telephone connector jack. Outlet 103d differs from outlet 90 by not having analog video source connection support, because no A/D 21 and associated jack are present. Outlet 101b differs from outlet 104a by having no PSTN connection support, because no LPF 37 and associated jack are present. Any mixture of such outlets (104a, 101b, 102c and 103d) or any other variants is possible.

Both networks 80 and 100 support the connectivity of both video units and DTEs. However, the analog video signal transportation is not to be limited to be carried solely between video units. For example, the analog video signal generated by video source 23 can be routed to a PC 17 (such as shown in FIGS. 1 and 2), wherein the video signal is shown on the PC monitor or directly by digital monitor, as well as being stored in the PC memory. Similarly, digital content within a PC or any other digital storage can be output to a video target 24.

Network 100 of FIG. 11 supports analog video signal transportation via analog video units 23a, 23b, and 24c. Simultaneously, PSTN telephony services can be accessed by analog telephone sets 22a, 22b, and 22c. In addition, data networking can be accomplished by data units 7a, 7b and 7c.

Although outlets 79 and 90 and their variants are each described above as having up to one single video source connection, up to one video target connection, up to one data unit interface, it is understood that multiple such interfaces can be supported within a single outlet. For example, an additional video source interface can be added to an outlet by adding an auxiliary hub port (if required), connected to an auxiliary A/D unit 21 connected to an auxiliary connector 72. Similarly, multiple data network interfaces can be included within an outlet, each connected to different ports of a respective hub (such as hub 41a).

Figure 12:
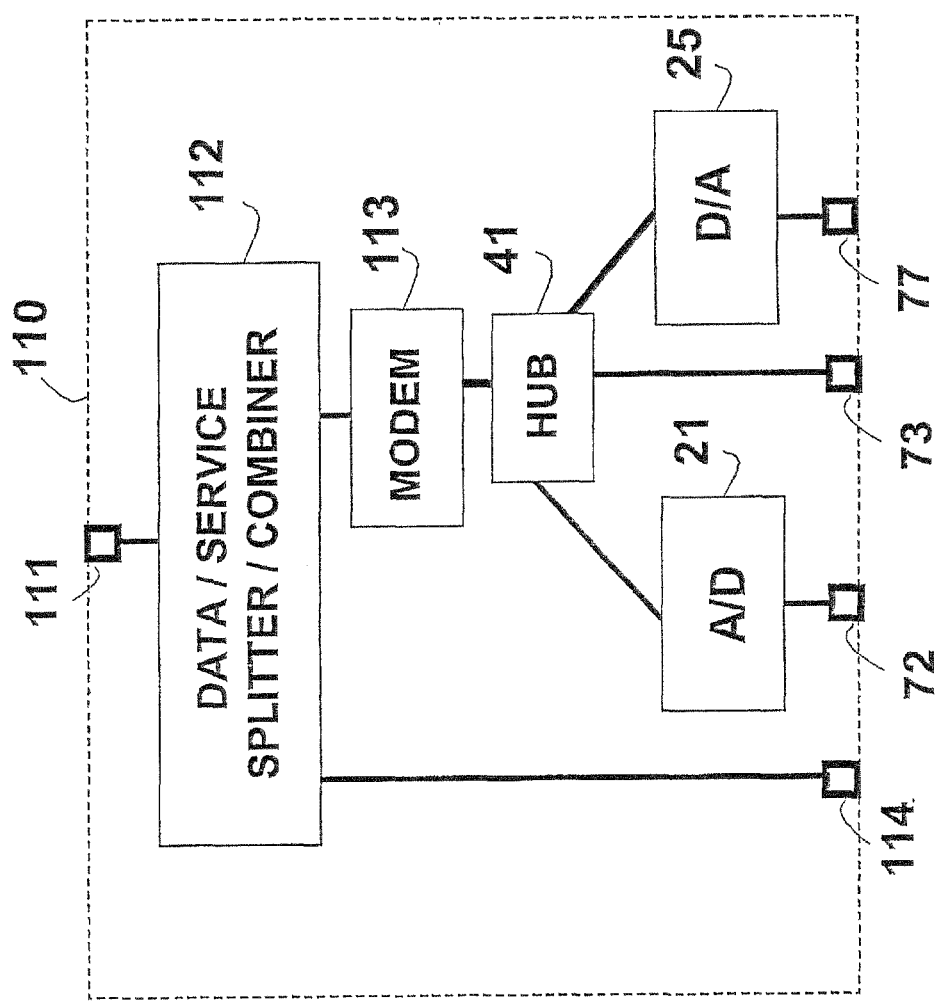
FIG. 12 illustrates a general form of an outlet according to the present invention, which can serve in various wired network environments, such as CATV and electrical power networks.

Although the invention has been so far described with regard to telephone wiring and telephone outlets, the invention can be similarly applied to any type of wired networking within a building, such as CATV or electrical power wiring. FIG. 12 illustrates an outlet 110, which is a general embodiment of the present invention. Outlet 110 is similar in overall layout to outlet 90 (FIG. 9). Outlet 110 connects to the relevant wiring via a connector 111 and contains an integrated data/service splitter/combiner unit 112, which isolates the data carried over the wiring from the main service signal. In the case of telephony, unit 112 contains a low-pass filter (such as LPF 37) and a high-pass filter (such as HPF 38). In the case of electrical power wiring, the AC power is split by unit 112 and fed to a socket 114, for supplying electrical power as normal. In such a case, a modem 113 being a power-line carrier (PLC) modem interfaces the hub 41 to the integrated data/service splitter/combiner unit 112, and allows data communication over the power line. Similarly, in the case of a CATV application, where the CATV wiring is used for the network infrastructure, a coaxial cable modem is used as modem 113 and unit 112 isolates the CATV signal from the data signal.

Although the invention has been so far described as relating to Ethernet based data networks, the invention can be similarly applied to any type of wired network, including non-packet based. Furthermore, although packet networks are the most important for wide area networks, the invention is not restricted to packet networks only, and can be applied to any digital data network, where video signals are digitized and carried in digital form.

Although the invention has been so far described as relating to analog video transportation over a digital data networks, the invention can be similarly applied to any type of analog signals, including voice or analog sensors. For example, such a network can be used to carry analog audio signals from an audio system to remote analog speakers.

Although the invention has been so far described as relating to simple digitizing the incoming analog video or audio signal using A/D 21, additional analog or digital processing can be applied within the outlet. For example, as shown in FIG. 9 there may be provided a processor 95 allowing compression techniques to be used in order to allow efficient use of the digital data network bandwidth MPEG Encoding techniques are known in the art for compression of analog and audio signals. In such a scenario, the processor 95 is coupled to the output of the A/D 21 although the A/D 21 may be modified to include an MPEG encoder constituted by the processor 95. Similarly, relevant analog or digital processing can be performed on the signal as part of D/A 25, such as MPEG decoder as part of the unit.

Furthermore, although the invention has been described as relating to networks based on continuous electrical conducting media (telephone, CATV, or electrical power), and the relevant modem and associated circuitry are connected in parallel to the wiring infrastructure, the invention can be applied equally to the case wherein the wiring is not continuous, but is cut into discrete segments as disclosed in WO 00/07322 to the present inventor, which is incorporated by reference for all purposes as if fully set forth herein.

The invention described can be equally used in new installations of data network in an office or home environment, as well as in retrofit applications, wherein the existing outlets (either LAN, telephone or any other) are substituted with outlets according to the invention.

While the invention has been described with respect to a limited number of embodiments, it will be appreciated that many variations, modifications and other applications of the invention may be made.

What is claimed is:

1. A system for transporting an analog video signal from an analog video source to a video target in a building over a home network, said system comprising:
   a coaxial cable on which the home network is based, said coaxial cable being disposed at least in part in walls of the building and connectable via one or more CATV outlets, said coaxial cable being connected for concurrently carrying a CATV signal in a CATV frequency band and bi-directional packet-based digital data in a digital data frequency band, the digital data frequency band being distinct from the CATV frequency band;
   a first device for coupling the analog video signal from the analog video source to the digital data carried over said coaxial cable, said first device comprising a first single enclosure and, in said first single enclosure:
      a first analog video port for receiving the first analog video signal from the analog video source;
      a first analog to digital converter connected for digitizing the first analog video signal received at said first analog video port into first digitized analog video data;
      a first coaxial connector operative for connecting to said coaxial cable;
      a first coaxial cable modem coupled between said first coaxial connector and said first analog to digital converter for transmitting the digitized analog video data over said coaxial cable; and
      a first filter coupled between said coaxial connector and said coaxial cable modem for substantially passing signals in the digital data frequency band; and
   a second device for coupling the analog video signal to the video target, said second device comprising a second single enclosure and, in said second single enclosure:
      a second coaxial connector operative for connecting to said coaxial cable;
      a second coaxial cable modem coupled between said second coaxial connector and said second digital to analog converter for receiving the first digitized analog video data from said coaxial cable;
      a second filter coupled between said second coaxial connector and said second coaxial cable modem for substantially passing signals in the digital data frequency band;
      a second digital to analog converter for converting the first digitized analog video data back to the first analog video signal; and
      a second analog video port for transmitting the first analog video signal to the video target.

2. The system according to claim 1, wherein said analog video ports of said first and second devices are analog video connectors.

3. The system according to claim 2, wherein said analog video connectors are coaxial connectors.

4. The system according to claim 1, wherein at least one out of said analog video ports and said coaxial connectors is BNC type.

5. The system according to claim 1, wherein said first and second devices are each addressable in a Local Area Network (LAN).

6. The system according to claim 1, wherein at least one of said single enclosures of said first and second devices is attachable to a wall in the building.

7. The system according to claim 1, wherein at least one of said first and second devices further includes a multi-port packet sharing means consisting of one of: a switch; a router; and a gateway, coupled to pass digital data between said converter and said coaxial cable modem of said at least one of said first and second devices.

8. The system according to claim 1, wherein at least one of said first and second devices is further operative for coupling the CATV signal to a CATV set and further comprises:
   a standard CATV connector connectable to the CATV set for coupling the CATV signal to the CATV set; and
   a CATV filter coupled between said coaxial cable and said standard CATV connector for substantially passing signals in the CATV frequency band.

9. The system according to claim 1, wherein at least one of said single enclosures of said first and second devices is constructed to have at least one of the following:
   a form substantially similar to that of a standard CATV outlet;
   wall mounting elements substantially similar to those of a standard CATV wall outlet;
   a shape allowing direct mounting in an CATV outlet receptacle or opening; and
   a form to at least in part substitute for a standard CATV outlet.

10. The system according to claim 1, wherein at least one of said first and second devices is pluggable into and attachable to a CATV outlet.

11. The system according to claim 1, wherein at least one of said single enclosures of said first and second devices is structured to attach to a mating fixture secured on the wall.

12. The system according to claim 1, wherein the digital data carried over said coaxial cable at least in part conforms to Ethernet standard or Internet Protocol.

13. The system according to claim 1, wherein each of said coaxial cable modems of said first and second devices is operative to perform bi-directional communication with one or more identical coaxial cable modems connected to said coaxial cable.

14. The system according to claim 1, wherein said coaxial cable is connected in a point-to-point topology and each of said coaxial cable modems is operative to perform full-duplex point-to-point communication with only a single other coaxial cable modem over said coaxial cable.

15. The system according to claim 1, wherein the video source is one of: a VCR; a video camera; and a television receiver.

16. The system according to claim 1, further comprising the analog video source.

17. The system according to claim 16, wherein said video source is housed in said first single enclosure.

18. The system according to claim 1, wherein the video target is one of: a VCR; and a video monitor.

19. The system according to claim 1, further comprising the video target.

20. The system according to claim 19, wherein said video target is housed in said second single enclosure.

21. The system according to claim 1, wherein: the digitized analog video signal is carried over said coaxial cable in a compressed form; said first device further comprises a digital compressor coupled between said first converter and said first coaxial cable modem; and said second device further comprises a digital de-compressor coupled between said second converter and said second coaxial cable modem.

22. The system according to claim 21, wherein the digitized analog video signal is formed by MPEG based compression.

23. The system according to claim 1, further operative for digital data communication between first and second data units over said coaxial cable, wherein said first device further comprises:
a first data connector for connecting to the first data unit; and
a transceiver coupled between said first data connector and said first coaxial cable modem for transmitting digital data to, and receiving digital data from, the first data unit; and wherein said second device further comprises:
a second data connector for connecting to the second data unit; and
a transceiver coupled between said second data connector and said second coaxial cable modem for transmitting digital data to, and receiving digital data from, the second data unit;
and wherein said system is operative for bi-directional packet-based digital data communication between the first and second data units.

24. The system according to claim 23, wherein the communication with the first and second data units conforms to Ethernet standard or Internet Protocol, and each of said first and second data connectors is a RJ-45 type connector.

25. A video camera apparatus for use with a home network in a building, the home network being based on a coaxial cable that is at least in part in walls of the building and that is connectable via one or more CATV outlets, the coaxial cable being connected for concurrently carrying a CATV signal in a CATV frequency band and a bi-directional packet-based digital data signal in a digital data frequency band that is distinct from the CATV frequency band, said apparatus comprising, in a single enclosure:
a video camera for converting an optical image to a video signal;
a coaxial connector operative for connecting to the coaxial cable;
a coaxial cable modem coupled between said coaxial connector and said video camera for transmitting the video signal to the coaxial cable; and
a filter coupled between said coaxial connector and said coaxial cable modem for substantially passing signals in the digital data frequency band,
wherein the coaxial cable modem is operative for bi-directional packet-based digital data communication over the coaxial cable with one or more identical coaxial cable modems connected to the coaxial cable in the building.

26. The apparatus according to claim 25, wherein said coaxial connector is a BNC type connector.

27. The apparatus according to claim 25, wherein said apparatus is addressable in a Local Area Network (LAN).

28. The apparatus according to claim 25, wherein said single enclosure is attachable to a wall in the building.

29. The apparatus according to claim 25, further comprising a multi-port packet sharing means consisting of one of: a switch; a router, and a gateway, coupled to said coaxial cable modem.

30. The apparatus according to claim 25, wherein said single enclosure is constructed to have at least one of the following:
a form substantially similar to that of a standard CATV outlet;
wall mounting elements substantially similar to those of a standard CATV wall outlet;
a shape allowing direct mounting in an CATV outlet receptacle or opening; and
a form to at least in part substitute for a standard CATV outlet.

31. The apparatus according to claim 25, wherein said single enclosure is pluggable into and attachable to a CATV outlet.

32. The apparatus according to claim 25, wherein said single enclosures is structured to attach to a mating fixture secured on a wall of the building.

33. The apparatus according to claim 25, wherein digital data carried over the coaxial cable at least in part conforms to Ethernet standard or Internet Protocol.

34. The apparatus according to claim 25, wherein the coaxial cable is connected in a point-to-point topology and said coaxial cable modem is operative to perform full-duplex point-to-point communication with only a single other coaxial cable modem over the coaxial cable.

35. The apparatus according to claim 25, further operative for digital performing compression, wherein said apparatus further comprised a digital compressor coupled between said video camera and said coaxial cable modem.

36. The system according to claim 35, wherein the compression is MPEG based.

37. A device comprising:
a coaxial connector configured to connect said device to a coaxial cable, the coaxial cable being provided for coupling an analog video unit to the coaxial cable, and the coaxial cable being connected to concurrently carry an analog CATV signal in an analog CATV frequency band and serial bi-directional packet-based digital data including digitized video data in a digital data frequency band that is distinct from the analog CATV frequency band;
a filter coupled to said coaxial connector for substantially passing signals in the digital data frequency band and for substantially rejecting signals in the analog CATV frequency band;
a coaxial cable modem coupled to said filter for conducting the serial bi-directional packet-based digital data over the coaxial cable;
an analog video connector connectable for coupling an analog video signal to the analog video unit;
a converter between the analog video signal and the digitized video data coupled to said analog video connector, said converter comprising at least one of an analog to digital converter and a digital to analog converter;
a packet-based interconnection apparatus consisting of one of: a switch; a router; and a gateway, coupled between said converter and said coaxial cable modem to pass the digitized video data therebetween; and
a single enclosure housing said coaxial connector, said filter, said coaxial cable modem, said analog video connector, said converter and said interconnection apparatus.

38. The device according to claim 37, further operative for coupling the analog CATV signal to an analog CATV set, said device further comprising:
a CATV filter coupled to said coaxial connector for substantially passing only signals in the analog CATV frequency band; and
a standard CATV connector coupled to said CATV filter and connectable to the analog CATV set for coupling the analog CATV signal to the analog CATV set.

39. The device according to claim 37, wherein said single enclosure is constructed to have at least one of the following:
a form substantially similar to that of a standard CATV outlet;
wall mounting elements substantially similar to those of a standard CATV wall outlet;
a shape allowing direct mounting in a CATV outlet receptacle or opening; and
a form to at least in part substitute for a standard CATV outlet.

40. The device according to claim 37, wherein said device is electrically pluggable into and mechanically attachable to a CATV outlet.

41. The device according to claim 37, wherein said single enclosure is structured to attach to a mating fixture secured on a wall of a building.

42. The device according to claim 37, wherein the serial bi-directional packet-based digital data further includes a first digital data signal and the device is further operative for coupling the first digital data signal to a data unit, and said device further comprises:
a data interface connector connectable to the data unit; and
a transceiver coupled between said interconnection apparatus and said data interface connector for conducting bi-directional serial digital data communication with the data unit,
wherein said interconnection apparatus is coupled to pass the first digital data signal between said coaxial cable modem and said transceiver.

43. The device according to claim 37, wherein the communication with said data unit conforms to an Ethernet standard or Internet Protocol.

44. The device according to claim 37, wherein said coaxial cable modem is operative to perform bi-directional communication with one or more identical coaxial cable modems connected to the coaxial cable.

45. The device according to claim 37, wherein said coaxial cable modem is operative to perform full-duplex point-to-point communication with only a single other coaxial cable modem over the coaxial cable.

46. The device according to claim 37, wherein said converter consists of an analog to digital converter, and the analog video unit is a video source.

47. The device according to claim 37, wherein said converter consists of a digital to analog converter, and the analog video unit is a video receiver.

48. The device according to claim 37, wherein the digitized video data is in a compressed form, and said device further comprises a digital compressor or a digital de-compressor coupled between said converter and said interconnection apparatus.

49. The device according to claim 48, wherein the compression is MPEG based.

50. The device according to claim 37, further being addressable in a Local Area Network (LAN).

51. A video network in a building for carrying a video signal from an analog video source to an analog video receiver, said network comprising:
first and second CATV outlets;
pre-existing CATV coaxial cable wiring at least in part in a wall of the building and connecting said first and second CATV outlets, the CATV coaxial cable wiring being connected to concurrently carry an analog CATV signal in an analog CATV frequency band and a bi-directional serial packet-based digital data signal in a digital data frequency band distinct from the analog CATV frequency band, the digital data signal carrying at least first packetized and digitized video data;
a first device connected to said first CATV outlet and connectable to the analog video source, said first device being operative to digitize and packetize the analog video signal from the analog video source to form the first packetized and digitized video data and to couple the digitized and packetized analog video data onto the CATV coaxial cable; and
a second device connected to said second CATV outlet and connectable to the analog video receiver, said second device being operative to convert the digitized and packetized data received from the CATV coaxial cable back into the analog video signal for coupling to the analog video receiver.

52. The network according to claim 51, wherein at least one of said first and second devices is housed in a single enclosure dimensioned to be wall-mountable in a standard CATV outlet receptacle or opening.

53. The network according to claim 51, wherein at least one of said first and second devices is housed in a single enclosure, and, wherein the single enclosure is constructed to have at least one of the following:
a form substantially similar to that of a standard CATV outlet;
wall mounting elements substantially similar to those of a standard CATV wall outlet;
a shape allowing direct mounting in a CATV outlet opening or cavity; and
a form to at least in part substitute for a standard CATV outlet.

54. The network according to claim 51, wherein the digitized and packetized analog video signal is based on standard Ethernet or Internet Protocol.

55. The network according to claim 51, further comprising a gateway coupled between an IP network external to the building and said CATV coaxial cable, said gateway being operative to couple said network to the Internet.

56. A network for coupling first and second digitized video data carried as part of respective first and second bi-directional serial packet-based digital data streams external to a building to respective ones of first and second analog video units in the building, said network comprising:
- a CATV coaxial cable at least in part in walls of the building and at least in part external to the building, said CATV coaxial cable being connected to carry the first and second bi-directional serial digital data streams in time-multiplexed form;
- wiring distinct from said CATV coaxial cable and at least in part in walls of the building, said wiring being connected to carry the second bi-directional serial packet-based digital data stream;
- a CATV outlet mounted in a wall opening or CATV outlet opening and connected to said CATV coaxial cable;
- a second outlet mounted in a wall opening or outlet opening and connected to said wiring;
- a first device couplable to a first analog video unit and connected to said CATV outlet for connecting to said CATV coaxial cable, said first device being connected to said wiring and being operative to couple the first digitized video data to the first analog video unit and to pass only the second bi-directional serial digital data stream between said CATV coaxial cable and said wiring; and
- a second device couplable to the second analog video unit and connected to said second outlet for connecting to said wiring, said second device being operative to couple the second digitized video data to the second analog video unit.

57. The network according to claim 56, wherein said first device is attached to said CATV outlet.

58. The network according to claim 56, wherein said second device is attached to said second outlet.

59. The network according to claim 56, wherein said CATV coaxial cable is connected to further simultaneously carry a service signal using frequency domain multiplexing.

60. The network according to claim 56, wherein said wiring is the same as, or different from, the CATV coaxial cable and said second outlet is a second CATV outlet.

61. The network according to claim 56, wherein the time-multiplexed first and second serial packet-based digital data is carried over said CATV coaxial cable using CATV data protocol.

62. The network according to claim 56, wherein said wiring is further connected to simultaneously carry a service signal using frequency domain multiplexing.

63. The network according to claim 62, wherein said wiring is a telephone wire pair, the service signal is an analog telephone signal and said second outlet is a telephone outlet.

64. A network for coupling first and second digitized video data carried as part of respective first and second bi-directional serial packet-based digital data streams external to a building to respective ones of first and second analog video units in the building, said network comprising:
- wiring at least in part in walls of the building and at least in part external to the building, said wiring being connected to carry the first and second bi-directional serial digital data streams in time-multiplexed form;
- a CATV coaxial cable distinct from said wiring and at least in part in walls of the building, said CATV coaxial cable being connected to carry the second bi-directional serial packet-based digital data stream;
- a first outlet mounted in a wall opening or outlet opening and connected to said wiring;
- a CATV outlet mounted in a wall opening or outlet opening and connected to said CATV coaxial cable;
- a first device couplable to a first analog video unit and connected to said first outlet for connecting to said wiring, said first device being connected to said CATV coaxial cable and being operative to couple the first digitized video data to the first analog video unit and to pass only the second bi-directional serial digital data stream between said wiring and said CATV coaxial cable; and
- a second device couplable to the second analog video unit and connected to said CATV outlet for connecting to said CATV coaxial cable, said second device being operative to couple the second digitized video data to the second analog video unit.

65. The network according to claim 64, wherein said first device is attached to said first outlet.

66. The network according to claim 64, wherein said second device is attached to said CATV outlet.

67. The network according to claim 64, wherein said wiring is connected to further simultaneously carry a service signal using frequency domain multiplexing.

68. The network according to claim 67, wherein said wiring is a telephone wire pair, said service signal is an analog telephone signal and said first outlet is a telephone outlet.

69. The network according to claim 68, wherein the time-multiplexed first and second serial digital data streams are carried over said wiring using DSL.

70. The network according to claim 64, wherein said CATV coaxial cable is further connected for simultaneously carrying an analog CATV signal using frequency domain multiplexing.

71. A device for coupling a digitized version of analog signals to one or more analog devices, for use with a CATV coaxial cable installed in walls of a building and connected for carrying a bi-directional digital data signal and a power signal over the same cable, the digital data signal containing the digitized version of the analog signals, said device comprising:
- a coaxial connector connectable to the coaxial cable;
- a coaxial cable modem coupled to said coaxial connector for transmitting and receiving the digital data signal carried over the coaxial cable and containing both a digitized version of a first analog signal and a digitized version of a second analog signal;
- a first analog connector for receiving the first analog signal in analog form from an analog device;
- a second analog connector for transmitting the second analog signal in analog form to an analog device;
- an analog to digital converter coupled between said first analog connector and said modem and operative for converting the first analog signal from analog form to the digitized version;
- a digital to analog converter coupled between said second analog connector and said modem and operative for converting the second signal from the digital version to analog form; and
- a single enclosure housing said coaxial connector, said coaxial cable modem, said converters and said first and second analog connectors, wherein said coaxial cable modem and said converters are coupled to the coaxial cable in order to be powered by the power signal.

72. The device according to claim 71, wherein said single enclosure is constructed to have at least one of the following:
- a form substantially similar to that of a standard CATV outlet;
- wall mounting elements substantially similar to those of a standard CATV wall outlet;
- a shape allowing direct mounting in a CATV outlet opening or cavity; and
- a form to at least in part substitute for a standard CATV outlet.

73. The device according to claim 71, wherein the digital data signal is a packet-based signal.

74. The device according to claim 71, further comprising a data compressor/decompressor coupled between said coaxial cable modem and one of said converters for compressing or decompressing the digitized version of the respective analog signal.

75. The device according to claim 74, wherein the compressing is MPEG based.

76. The device according to claim 71, wherein at least one of the analog signals is one of an audio signal and a video signal.

77. The device according to claim 71, wherein at least one of the analog signals is an audio signal and the respective analog connector is an audio connector.

78. The device according to claim 71, wherein the power signal is carried over the cable concurrently with the digital data signal.

79. The device according to claim 78, wherein the power signal is carried in a power signal frequency band and the digital data signal is carried in a data signal frequency band using frequency division multiplexing, the data signal frequency band is distinct from the power signal frequency band, and said device further comprises:
- a first filter coupled between said coaxial connector and said modem for substantially passing only the digital data signal; and
- a second filter coupled between said coaxial connector and said converters for substantially passing only the power signal to power said converters.

80. The device according to claim 79, wherein the power signal is a DC signal.

81. The device according to claim 71, wherein said coaxial cable modem is operative to perform bi-directional communication with one or more identical modems connected to the CATV coaxial cable.

82. The device according to claim 71, wherein the analog signals are analog video signals, and said device further comprises a multi-port packet component consisting of one of: a switch; a router; and a gateway, said multi-port packet component being coupled to pass the digitized version of the analog video signals between said converters and said coaxial cable modem.

83. The device according to claim 82, wherein: the bi-directional digital data signal is serial and packet-based and includes a first digital data signal; said device is further operative for coupling the first digital data signal to a data unit; and said device further comprises, in said single enclosure:
- a data interface connector connectable to the data unit; and
- a transceiver coupled between said multi-port packet sharing component and said data interface connector for conducting a bi-directional serial digital data communication with the data unit, and
- further, wherein said multi-port packet component is coupled to pass the first digital data signal between the CATV coaxial cable and said transceiver.

84. The device according to claim 83, wherein communication with the data unit conforms to Ethernet standard or Internet Protocol.

85. The device according to claim 71, wherein said coaxial cable modem is operative to perform full-duplex point-to-point communication with only a single other modem over the CATV coaxial cable.

86. The device according to claim 71, wherein said device is pluggable into and attachable to a CATV outlet.

87. The device according to claim 71, wherein said single enclosure is structured to attach to a mating fixture secured on a wall of the building.

88. A device for coupling digitized versions of first and second analog signals to one or more analog devices, for use with a CATV coaxial cable installed in walls in a building and connected for carrying a bi-directional digital data signal in a data signal frequency band and a power signal in a power signal frequency band using frequency division multiplexing, the data signal frequency band being distinct from the power signal frequency band, and the digital data signal containing the digitized versions of the first and second analog signals, said device comprising:
- a coaxial connector connectable to the coaxial cable;
- a filter coupled to said coaxial connector for passing only the digital data signal;
- a coaxial modem coupled to said coaxial connector for transmitting the digital data signal to, and receiving the digital data signal from, the coaxial cable;
- a first analog connector for receiving the first analog signal in analog form from an analog device;
- a second analog connector for transmitting the second analog signal in analog form to an analog device;
- an analog to digital converter coupled between said first analog connector and said coaxial modem and operative for converting the first analog signal in analog form to the digitized version of the first analog signal;
- a digital to analog converter coupled between said second analog connector and said coaxial modem and operative for converting the digitized version of the second analog signal to the second analog signal in analog form; and
- a single enclosure housing said coaxial connector, said filter, said coaxial modem, said first and second analog connectors and said converters.

89. The device according to claim 88, wherein said single enclosure is constructed to have at least one of the following:
- a form substantially similar to that of a standard CATV outlet;
- wall mounting elements substantially similar to those of a standard CATV wall outlet;
- a shape allowing direct mounting in an CATV outlet opening or cavity; and
- a form to at least in part substitute for a standard CATV outlet.

90. The device according to claim 88, wherein the digital data signal is a packet-based signal.

91. The device according to claim 88, further comprising a compressor/decompressor coupled between said coaxial modem and at least one of said converters for compressing or decompressing the digitized version of the respective analog signal.

92. The device according to claim 91, wherein the compression performed by said compressor is MPEG based.

93. The device according to claim 88, wherein at least one of the analog signals is one of an audio signal and a video signal.

94. The device according to claim 88, wherein at least one of the analog signals is an audio signal and the analog connector associated with said at least one of the analog signals is an audio connector.

95. The device according to claim 88, wherein said device is further operative for coupling at least part of the digital data signal to a data unit, and said device further comprises, in said single enclosure:
- a data connector connectable to the data unit; and
- a multiport component consisting of one of: a hub; a switch; a router; and a gateway, said multipart component being coupled to said coaxial modem and to at least one of said converters.

96. The device according to claim 95, wherein communication with the data unit conforms to Ethernet standard or Internet Protocol.

97. The device according to claim 88, wherein the data signal frequency band is higher than the power signal frequency band, and wherein said filter is a high pass filter.

98. The device according to claim 88, wherein said coaxial modem is operative to perform full-duplex point-to-point communication with only a single other modem over the CATV coaxial cable.

99. The device according to claim 88, wherein said device is pluggable into and attachable to an outlet.

100. The device according to claim 88, wherein said single enclosure is structured to attach to a mating fixture secured on a wall of the building.

* * * * *